(12) United States Patent (10) Patent No.: US 8,171,125 B2
Gopalakrishnan (45) Date of Patent: May 1, 2012

(54) SCALABLE DISTRIBUTED STORAGE AND DELIVERY

(75) Inventor: Shivakumar Gopalakrishnan, Union City, CA (US)

(73) Assignee: Xstor Systems, Inc., Mountain View, CA (US)

( * ) Notice: Subject to any disclaimer, the term of this patent is extended or adjusted under 35 U.S.C. 154(b) by 0 days.

(21) Appl. No.: 12/955,656

(22) Filed: Nov. 29, 2010

(65) Prior Publication Data

US 2011/0072108 A1 Mar. 24, 2011

Related U.S. Application Data

(62) Division of application No. 11/319,293, filed on Dec. 23, 2005, now Pat. No. 7,844,691.

(60) Provisional application No. 60/640,585, filed on Dec. 30, 2004.

(51) Int. Cl.
*G06F 15/173* (2006.01)
(52) U.S. Cl. ............ 709/223; 709/224; 709/203
(58) Field of Classification Search .......... 709/201, 709/203, 217, 223, 224; 718/105; 725/93, 725/25
See application file for complete search history.

(56) References Cited

U.S. PATENT DOCUMENTS

| | | | |
|---|---|---|---|
| 5,754,938 A * | 5/1998 | Herz et al. ........... 725/116 |
| 5,774,660 A | 6/1998 | Arendel et al. | |
| 6,578,066 B1 | 6/2003 | Logan et al. | |
| 6,829,637 B2 | 12/2004 | Kokku et al. | |
| 7,062,556 B1 * | 6/2006 | Chen et al. ........... 709/226 |
| 7,069,267 B2 * | 6/2006 | Spencer, Jr. ........... 1/1 |
| 7,305,429 B2 * | 12/2007 | Borella ........... 709/203 |
| 7,315,541 B1 * | 1/2008 | Housel et al. ........... 370/392 |
| 7,647,427 B1 | 1/2010 | Devarapalli | |
| 7,809,840 B2 * | 10/2010 | Jing et al. ........... 709/227 |
| 2001/0034795 A1 | 10/2001 | Moulton et al. | |
| 2001/0037323 A1 | 11/2001 | Moulton et al. | |
| 2002/0013832 A1 | 1/2002 | Hubbard | |
| 2002/0046360 A1 | 4/2002 | Watkins et al. | |
| 2002/0083118 A1 * | 6/2002 | Sim ........... 709/105 |
| 2002/0120763 A1 | 8/2002 | Miloushev et al. | |
| 2003/0046313 A1 | 3/2003 | Leung et al. | |
| 2003/0046355 A1 | 3/2003 | Rosenberg et al. | |
| 2003/0061323 A1 * | 3/2003 | East et al. ........... 709/223 |
| 2003/0079016 A1 | 4/2003 | Tsao | |
| 2003/0079019 A1 | 4/2003 | Lolayekar et al. | |
| 2003/0110263 A1 | 6/2003 | Shillo | |
| 2003/0120751 A1 | 6/2003 | Husain et al. | |
| 2003/0140051 A1 | 7/2003 | Fujiwara et al. | |

(Continued)

OTHER PUBLICATIONS

International Search Report and Written Opinion dated Jul. 7, 2008 for PCT Application Serial No. PCT/US05/47325, 9 pages. OA dated Sep. 19, 2008 for U.S. Appl. No. 11/319,293, 31 pages.
OA dated Jan. 9, 2009 for U.S. Appl. No. 11/319,293, 32 pages.
OA dated Aug. 31, 2009 for U.S. Appl. No. 11/319,293, 26 pages.
OA dated Feb. 19, 2010 for U.S. Appl. No. 11/319,293, 37 pages.

*Primary Examiner* — LaShonda T Jacobs
(74) *Attorney, Agent, or Firm* — Turocy & Watson, LLP

(57) ABSTRACT

Embodiments describe scalable distributed storage delivery method that can utilize commodity storage devices, thus there is little, if any, modification of the existing storage hardware or storage clients. According to an aspect is a system that can include a plurality of primary servers and application servers to deliver data to the storage client. The client can request information from the primary server, which can in some embodiments, authenticate the client. The primary server can determine a set of application servers that can deliver the information. The information data can be served to the client transparently from the application servers. The application servers can read the information content from a local cache or directly from storage devices.

20 Claims, 21 Drawing Sheets

U.S. PATENT DOCUMENTS

| | | |
|---|---|---|
| 2003/0145086 A1* | 7/2003 | O'Reilly .................... 709/226 |
| 2003/0233518 A1 | 12/2003 | Yamagami et al. |
| 2004/0010563 A1 | 1/2004 | Forte et al. |
| 2004/0064543 A1 | 4/2004 | Ashutosh et al. |
| 2004/0088400 A1 | 5/2004 | Dagget |
| 2004/0093555 A1 | 5/2004 | Therrien et al. |
| 2004/0103206 A1 | 5/2004 | Hsu et al. |
| 2004/0158614 A1* | 8/2004 | Williams .................... 709/207 |
| 2004/0199646 A1* | 10/2004 | Susai et al. .................... 709/227 |
| 2005/0102405 A1* | 5/2005 | Siegel .......................... 709/227 |
| 2005/0262245 A1* | 11/2005 | Menon et al. ................ 709/226 |

\* cited by examiner

SCALABLE DISTRIBUTED STORAGE AND DELIVERY

CROSS-REFERENCE TO RELATED APPLICATIONS

This application is a divisional application of U.S. patent application Ser. No. 11/319,293, now U.S. Pat. No. 7,844, 691, filed Dec. 23, 2005, entitled "SCALABLE DISTRIBUTED STORAGE SYSTEM AND DELIVERY METHOD", and assigned to the assignee hereof, which claims the benefit of U.S. Provisional Application Serial No. 60/640,585, filed on Dec. 30, 2004, and entitled "SCALABLE DISTRIBUTED STORAGE SYSTEM AND DELIVERY METHOD," the entirety of the applications are incorporated herein by reference.

TECHNICAL FIELD

The subject disclosure relates generally to computer systems, and more specifically to fault tolerant, redundant, and scalable distributed storage and delivery.

BACKGROUND

As usage of computers and computer related services increases, storage requirements for enterprises and Internet related infrastructure companies are exploding at an unprecedented rate. Industry estimates indicate that storage capacity is doubling every nine to twelve months. Enterprise applications, both at the corporate and departmental level, are causing this huge growth in storage requirements. Recent user surveys indicate that the average enterprise has been experiencing a 52% growth rate per year in storage. In addition, over 25% of the enterprises experienced more than 50% growth per year in storage needs, with some enterprises registering as much as 500% growth in storage requirements.

Administrators face increasing amounts of data and are under tremendous pressure to reduce downtime due to data not being readily available, or not available at all. Acts such as the Health Insurance Portability and Accountability Act (HIPAA) or the Sarbanes-Oxley Act, for example, increase compliance requirements and specify that data should be available at all times and should be produced on demand within a reasonable amount of time. Adding together, each minute of downtime can equate to thousands or even millions of dollars in lost revenue. Moreover, enterprises are under increasing pressure to maintain business continuance in light of a disaster and/or other unforeseen or foreseen disruptions. There is also a need for system confidence whereby administrators and users are confident that future needs will not outgrow the system.

Today, several approaches exist for networked storage, including hardware-based systems. These architectures work well but are generally expensive to acquire, maintain, and manage, thus limiting their use to larger businesses. Small and mid-sized businesses might not have the resources, including money and expertise, to utilize the available scalable storage solutions. Thus, currently available solutions do not provide fault tolerance, high availability, and scalability for small and mid-size business. This is true even though the data generated is equally important and necessary for the continued maintenance and viability of such businesses as it is for larger businesses.

Therefore, to overcome these as well as other challenges related to networked storage, there exists a need for a solution that requires a minimal amount of management, is fault tolerant, scalable, can utilize commodity off-the-shelf hardware and is easy to install, implement, and use.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with distributed computer storage for use in heterogeneous environments. According to an embodiment is a system and/or method for providing fault tolerant, redundant, scalable distributed storage and delivery using commodity storage and network infrastructures.

According to an aspect are a scalable distributed storage system, a computer program product, and an associated method that delivers data to a client selectively using a set of application servers for maximum performance in a fault tolerant manner According to another aspect is a global namespace among distributed primary servers using application aware intelligent caching and synchronization. Network congestion is reduced by use of geographically distributed application servers that are selectively distributed through the system. Without any modification to the client, a large number of files can be served using multiple application servers that have only parts of the files on each application server. High performance and optimal network utilization can be achieved by installing applications servers on the client machine itself, without requiring modification to the client applications. Performance scaling of a data center can be achieved by installing application server software on a data center machine to utilize unused server resources, such as memory, network bandwidth and CPU processing power. The data center machine can run or operate on a plurality of supported operating systems. Also provided is minimal overhead for synchronization of application servers as the global namespace is maintained only in the primary servers.

According to yet another aspect is the ability to scale storage, without modification of the storage devices, by use of symbolic links to the actual storage. Non-disruptive migration of data from one storage device to another is achieved through the intelligent use of replication and symbolic links. Dynamic replication results in uniform and balanced storage usage on the storage devices. Alternatively or in addition, multi-protocol support for the storage devices can be provided as the client accesses the storage through primary servers.

According to still another aspect is a fault tolerant system through the use of redundant commodity hardware and replicated data. Application aware dynamic data replication ensures the high availability of the most frequently assessed data. Additionally or alternatively, hierarchical storage management is provided without the use of complicated and expensive tape drives and optical drives.

Yet another aspect is a system that utilizes a set of primary servers and a plurality of storage devices connected to Ethernet switches, and application server software installed on servers to alleviate performance bottlenecks. The primary servers represent a single network virtual IP address for the clients to connect. The primary servers perform load balancing and failover among themselves using heartbeat and other commonly available IP load balancing techniques. The use of commodity redundant hardware provides for no single point of failure in the system. Thus, independent scaling of storage capacity and performance can be achieved in a non-disruptive manner Additionally, no modification should be necessary on the storage devices or the storage clients to realize the benefits of the system.

According to yet another aspect is a system that is scalable, distributed and fault tolerant while providing performance improvements with minimum overhead of synchronization. The system utilizes only parts of the file on the application servers in the system and, therefore, can serve a large number of files to a large number of clients. The network traffic on high cost links or low bandwidth links is minimized without modifications needed on the client application. The system can be flexible in supporting various network application server software, such as image serving, file serving or video streaming, with minimum modification to the network application software server. The storage capacity of the system is scalable by adding storage devices and through the use of a clustered file system on the primary servers. The system can result in a scalable distributed storage system and unique method of data delivery.

According to another aspect is a system that can be configured to allow communication between servers in the absence or presence of firewalls. System can determine the type(s) of firewalls present and make a determination as to an efficient communication path between the servers. The communication can include a Transmission Control Protocol (TCP) or User Datagram Protocol (UDP) with known or dynamically created ports, depending on the type of firewall present.

In accordance with another aspect is a technique for providing a secured data link between a server and a client. Through utilization of application servers that are located close to a client, or that are located on a client, the data link can be accomplished utilizing only the switches and/or routers that are on the same sub-network as the client, if such switches and/or routers exist. This can potentially reduce the exposure of a file content transfer between the client and the server, since the transfer can be from the application server, not the server.

According to still another aspect is the capability to provide seamless disaster recovery to a client(s). A single virtual IP address can be used by a client to contact a primary server. A backup server can mirror the content of the primary server by utilizing a replication technique. If a problem develops with the primary server, the backup server can automatically take over the communication and perform the necessary notifications to claim ownership of the virtual IP address.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
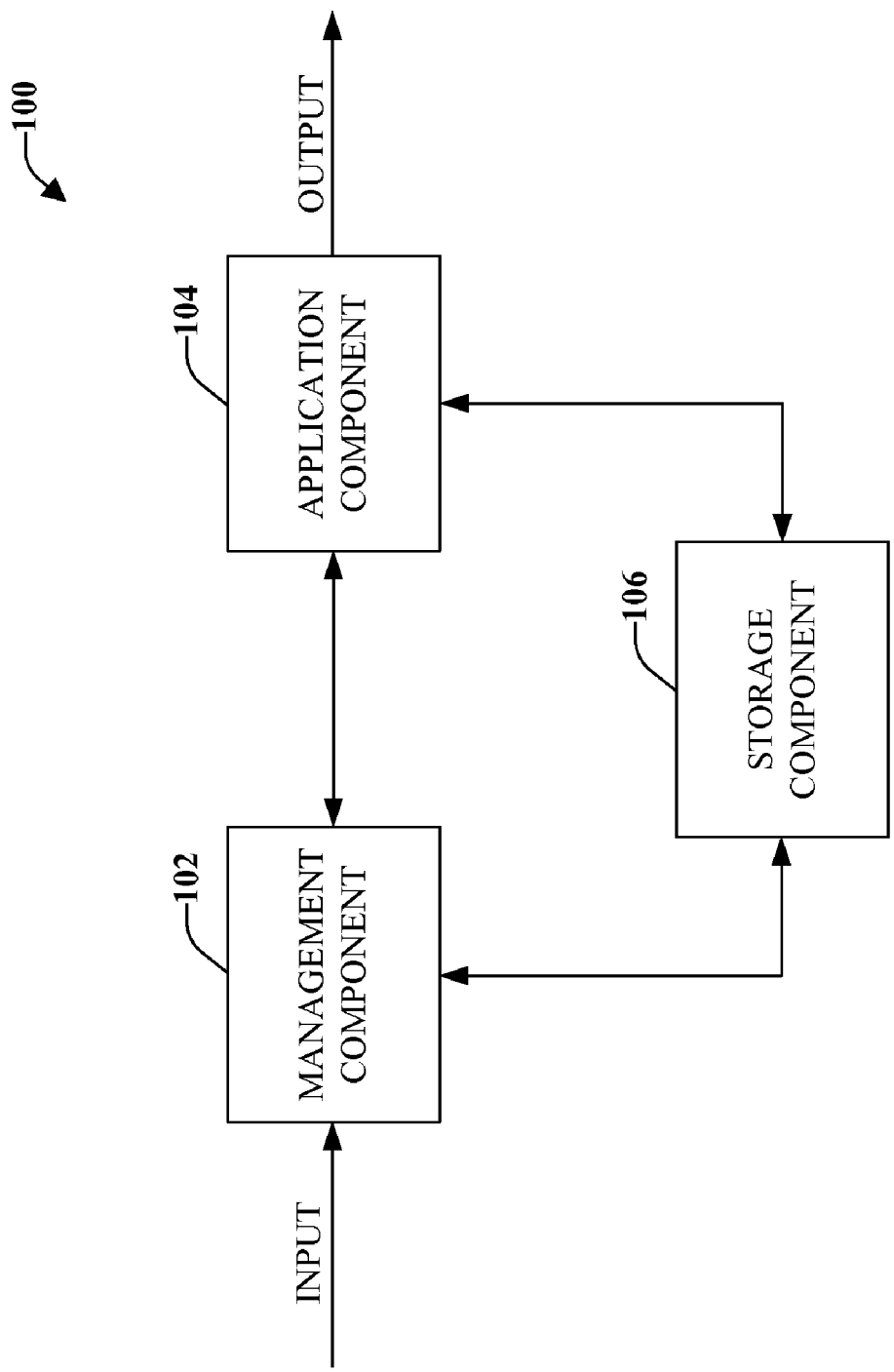
FIG. 1 illustrates a scalable distributed storage and delivery system.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component, "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the terms to "infer" or "inference" refer generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

Various embodiments will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

Referring initially to FIG. 1, illustrated is a scalable distributed storage and delivery system 100. System 100 can be implemented on various devices including, but not limited to storage routers, storage systems, and the like. System 100 includes a management component 102 and an application component 104. Although a number of management component(s) 102 and application component(s) 104 can be included in system 100, as will be appreciated, a single management component 102 that interfaces with a single application component 104 is illustrated for purposes of simplicity.

Management component 102 (or primary server component) can be configured to accept a user and/or entity (e.g., the Internet, another system, a computer . . . ) input, such as a request for data, documents, information, files, and the like. According to some embodiments, the input can be received from an application server when the communication path from the client is compromised. In some embodiments, management component 102 can authenticate the user based upon certain criteria or parameters provided separate from or along with the user input. Management component 102 can also be configured to determine one or more application component(s) 102 (or set of application components 102) that are appropriate to provide optimal performance (e.g., quickest response time, most appropriate data content, and the like). Selection of the one or more application components(s) 104 can be performed autonomously by management component(s) 102. Management component(s) 102 can relay or send a control message to application component(s) 104 allowing application component(s) 102 to retrieve and provide the requested data directly to the user.

According to other embodiments, management component(s) 102 can be configured to analyze various firewalls located in a network path and determine an optimal communication path between a client and servers. The resulting communication can use TCP or UDP. TCP is a networking protocol the can provide communication across interconnected networks, between computers that have diverse hardware architectures, and various operating systems. UDP is a technique for application(s) to access a connectionless protocol that, similar to TCP, runs on top of IP networks.

Management component(s) 102 can temporarily relinquish control of the request to the application component(s) 104. Allowing the data delivery to be provided directly to the user from the application component(s) 104 minimizes the load on primary server(s) 102. According to some embodiments, management component(s) 102 can include a clustered file system with distributed locking to provide a single system image if more than one management component 102 is utilized.

Application component 104 (or application server component) can be configured to read, distinguish, interpret the requested information (e.g., file, content, document, information . . . ) from its location (e.g., local cache) or retrieve it directly from a storage component 106. The information retrieved can be served, relayed, communicated, etc. to the user by application component 104. This serving or presenting of information is performed transparently to the user. That is to say, the user is not aware that it is the application component(s) 104 presenting the data and not the primary component(s) 102. Upon successful completion of the data transfer to the user, application component(s) 104 relinquish control of the connection to the user back to the management component 102, and normal operation is resumed (e.g., processing is performed by management component(s) 102.

Application component(s) 104 can be computer elements that include a storage unit(s), processing unit(s), memory unit(s), and/or a network unit(s). Further, application component(s) 104 can operate on any supported operating system and can access storage through management component(s) 102 and/or directly based on a mapping provided by management component(s) 102. Alternatively or in addition, the data can be pushed to the application component(s) 104 by management component(s) 102. In some embodiments, application components(s) 104 can access the requested data through conventional and/or peer-to-peer techniques.

Application component(s) 104 can participate in data retrieval and/or delivery when they are available and can decline to participate at any time, including during an active data transfer connection, without needing the link to be reset or another forms of reconnection. At various times in the process, application component(s) 104 may fail due to software, hardware, network, or other faults. System 100 can handle these failures seamlessly without affecting the user. For example, system 100 can deliver the data through another application component.

Management component(s) 102 and application component(s) 104 can be loosely connected by means of a network connection (e.g., an Ethernet network connection). This connection allows the application component(s) 104 to join or remove themselves from the plurality of application components at any time without disrupting data delivery. Minimum overhead of synchronization is necessary between application component(s) 104 and management component(s) 102. Application component(s) 104 hold no state information about the data and/or network connection. Since the application component(s) 104 are stateless, they form a scalable and reliable system, similar to an HTTP protocol.

The systems disclosed herein can be implemented, in part, at the kernel layer of a primary server. The systems could also be implemented on any computing network element, such as a storage router, director, switch, etc. The primary server module can work in conjunction with the network application server software. The network application server software can be any network application, such as, network file serving (e.g., Samba servers), video streaming, image serving applications, etc.

Figure 2:
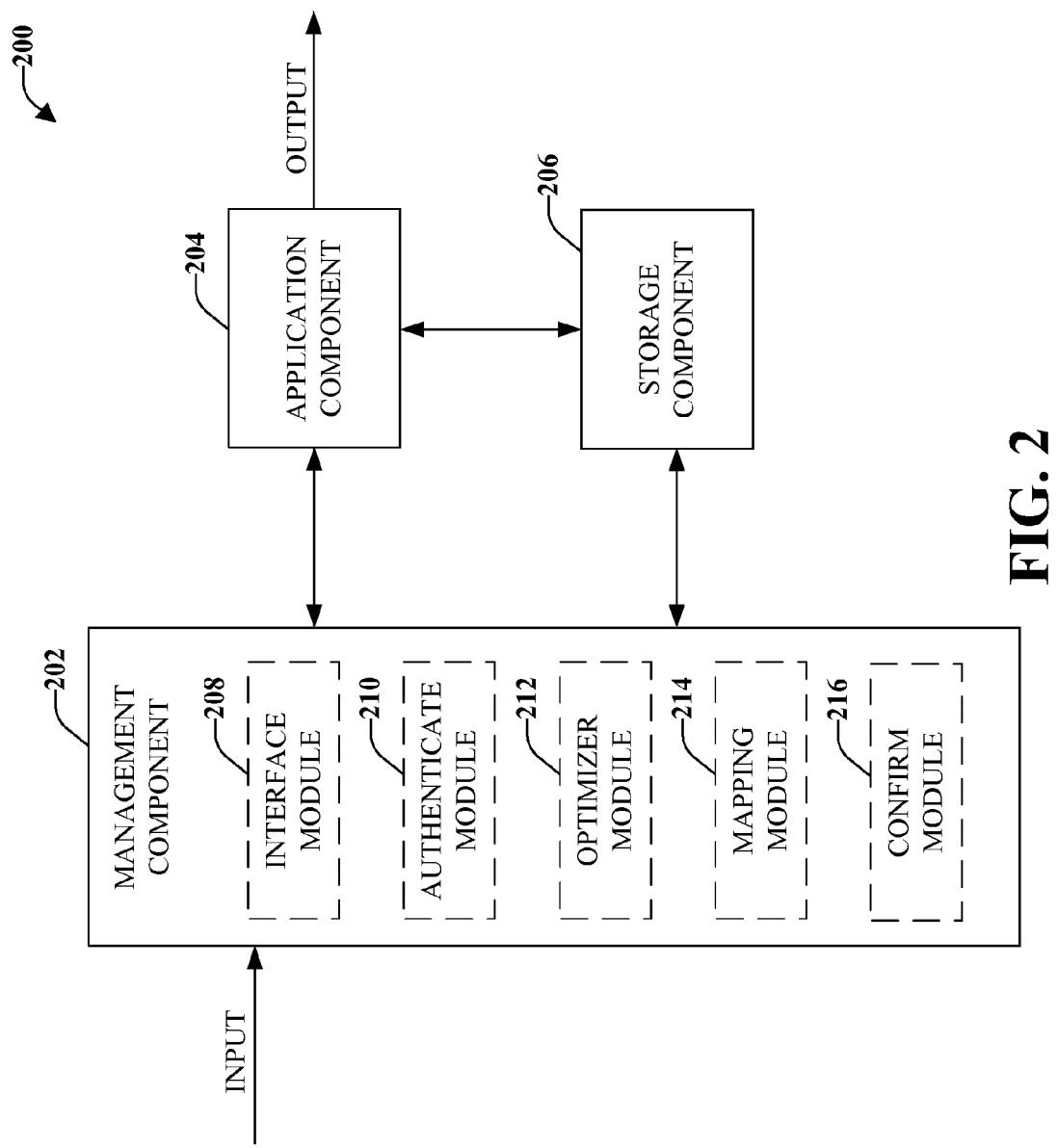
FIG. 2 illustrates a system for scalable distributed storage and delivery.

FIG. 2 illustrates a system 200 for scalable distributed storage and delivery. System 200 includes a management component 202 and an application component 204, however more than one of either or both can be included in system 200. Management component 202 and application component 204 interface to provide a user with requested information, from, for example a storage component 206.

Management component 202 can have a single virtual internet protocol (IP) address. With a single address, users only need to remember the single address to access data. Management component 202 can operate in a clustered environment that includes a single system image of the entire storage and/or other system resources of the clustered computing elements. Distributed locking can provide consistency and concurrency while allowing simultaneous read and write access of data from each management component 202. Failover is supported in the clustered environment. For example, when a primary server or management component 202 fails, another primary server takes over the functionality of the failed server.

Management component 202 can be configured to support virtual IP and IP load balancing and/or application load balancing. Management component 202 can be connected to storage devices by a network means. For example, the network means can be a Gigabit Ethernet type. Management component 202 can, in addition or alternatively, be connected to storage devices through a Fiber Channel switch and/or a shared SCSI switch. According to another embodiment, management component 202 can communicate with a duplicate or backup server (not shown). The backup server can provide seamless disaster recovery provided there is sufficient replication on the backup server. The backup server can be configured to perform the needed notifications to claim ownership of the virtual IP address.

Management component 202 can include an interface module 208 configured to receive input from one or more users, an authenticate module 210 configured to authenticate the one or more users, an optimizer module 212 configured to determine one or more application component(s) 204 for providing the user(s) requested information in an effective manner. In some embodiments, management component 202 can also include a mapping module 214 configured to provide mapping information to application component 204. Also included can be a confirm module 216 that confirms if the requested data has been provided to the user and/or successfully received by the user.

Interface module 208 can provide various types of user interfaces. For example, interface module 208 can provide a graphical user interface (GUI), a command line interface, and the like. For example, a GUI can be rendered that provides a user with a region or means to load, import, read, etc. a request and can include a region to present the results of such request. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the disclosed embodiments are not so limited. For example, merely highlighting a check box can initiate information conveyance. In another example, a command line interface can be employed. For example, the command line interface can prompt (e.g., through a text message on a display and an audio tone) the user for information by providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Authenticate module 210 can be configured to authenticate the user. It should be understood that an authenticate module 210 is optional and user authentication may not be utilized in accordance with some embodiments. Authentication of a user can include various identification means. For example, a user can be identified through a unique user name and/or user name/password pair. It should be understood that various other techniques can be utilized (e.g., machine recognition, voice recognition, . . . ) to authenticate a client and/or user.

Optimizer module 212 can be configured to determine a best application component or server 204 that can deliver the user request. The determination can be based upon the availability, the historical performance, the response, or another determination means for the one or more application server(s) 204. For example, a request can be sent from management component 202 to a plurality of application components. Each application component 204 can respond with its availability and whether or not it will participate in the data retrieval. According to another example, management component 202 can determine an optimal application component 204 to utilize based on the performance of that application component 204 in the past. A log or other means of identifying and retaining information can be utilized by management component 202 to facilitate such determination. It should also be understood that other optimization techniques can be utilized by system 200 to determine the one or more application components 204 to utilize for a particular data request.

Mapping module 214 can be utilized to provide information to the selected application component(s) 204. Mapping allows the application component(s) 204 to access the storage directly. If mapping is not provided, accessing the storage component can be performed by application component(s) 204 through the management component(s) 202.

Confirm module 216 can confirm whether the user has received the requested data. For example, if the user (or client system) does not receive a requested packet, it will not send an acknowledgement packet to the confirm component 202. This will cause the management component 202, through the optimizer module 212, to resend the packet to another application component 204. Thus, the reliability of the transfer is achieved without the overhead of tracking which packet was sent through which application component 204.

Figure 3:
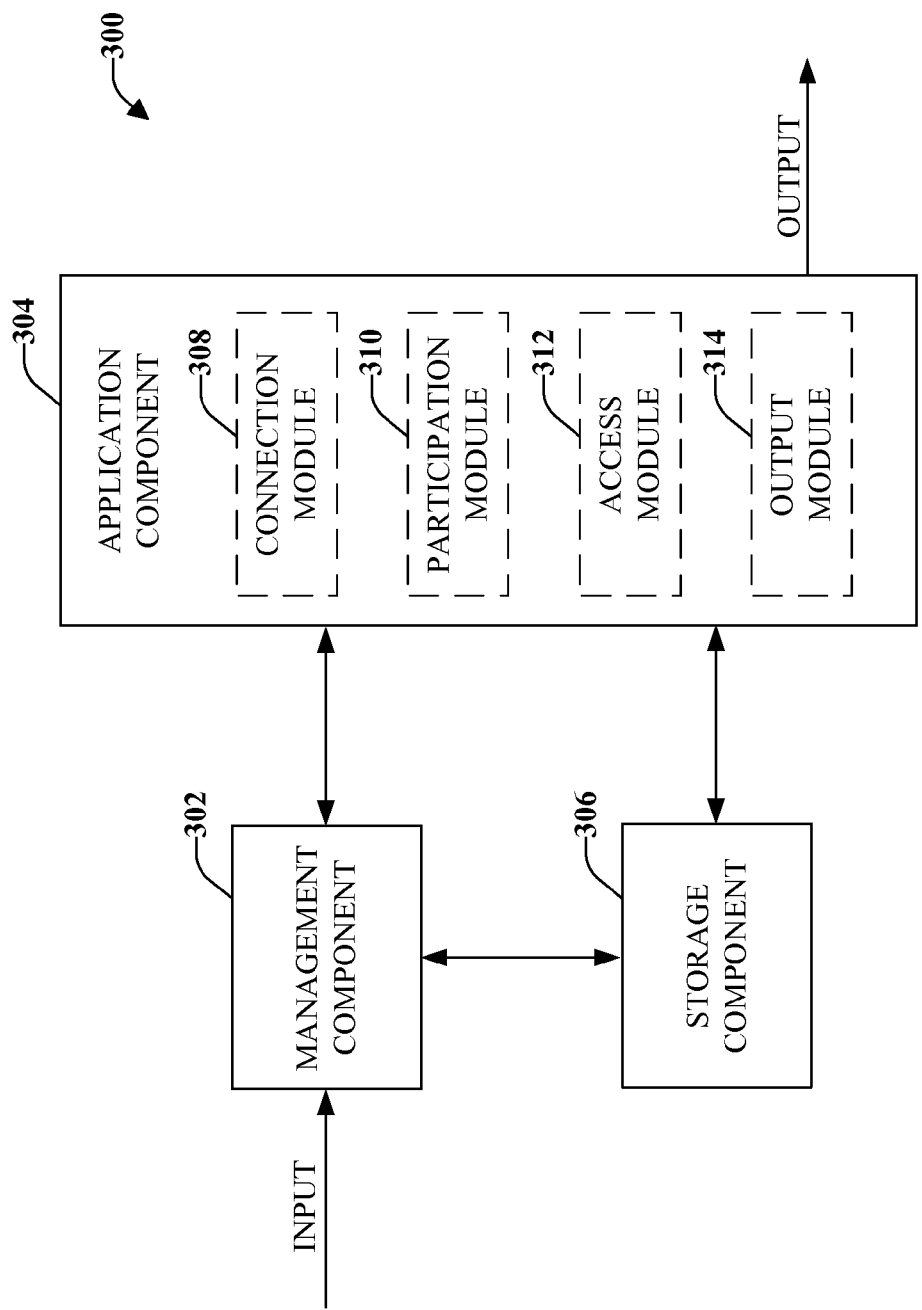
FIG. 3 illustrates another system that provides scalable distributed storage and delivery.

FIG. 3 illustrates another system 300 that provides scalable distributed storage and delivery. System 300 can include one or more management components 302, one or more application components 304, and one or more storage components 306. Management component 302 can be configured to receive a user request for information and make a determination of an appropriate application component 304 (or set of application components) to perform the requested action. Application component 304 can include various modules including an access module 308, a participation module 310, a connection module 312 and an output component 314.

Connection module 308 can receive a request from the management component 302 and reply with a message or signal indicating whether that particular application component 304 is available for access. For example, the application component 304 may not be available for access if it is busy performing other functions or due to some other reason (e.g., fault) and/or does not anticipate being able to service the request. Through connection module 308, application component 304 can join or remove themselves from a set of application servers at any time without disrupting data delivery.

Participation module 310 can indicate whether the application component 304 wants to participate in the file request. There are some situations where the application component is accessible, but does not want to participate. For example, application component 304 may be dedicated to another request or anticipate a subsequent request, rendering it unable to complete the current request. In addition or alternatively, application component 304 can decline to participate, through participation module 310, in the middle of an active data transfer connection without the link being reset or other forms of reconnection. If the application component 304 fails due to one or more failures (e.g., software, hardware, network, . . . ) it may become unable to participate and participation module 310 can notify system 300 of the failure, allowing system 300 time to redistribute the request among other application components.

Access module 312 can be configured to access storage through management component 302 or directly based on mapping provided by management component 302. According to some embodiments, access module 312 can further be configured to make a determination as to which storage devices to contact or access to retrieve the requested data. For example, access module 312 can maintain a file or other data storage means for indexing or categorizing data or information located on each storage component. The file or other storage means can include information based on previous requests (historical data) or information provided directly from the storage components.

Output component 314 can be configured to present the results to the user through various presentation means. For example, output component 314 can display the results directly on a user display. In some embodiments, output component 314 may direct the output to the user through the management component 304.

Figure 4:
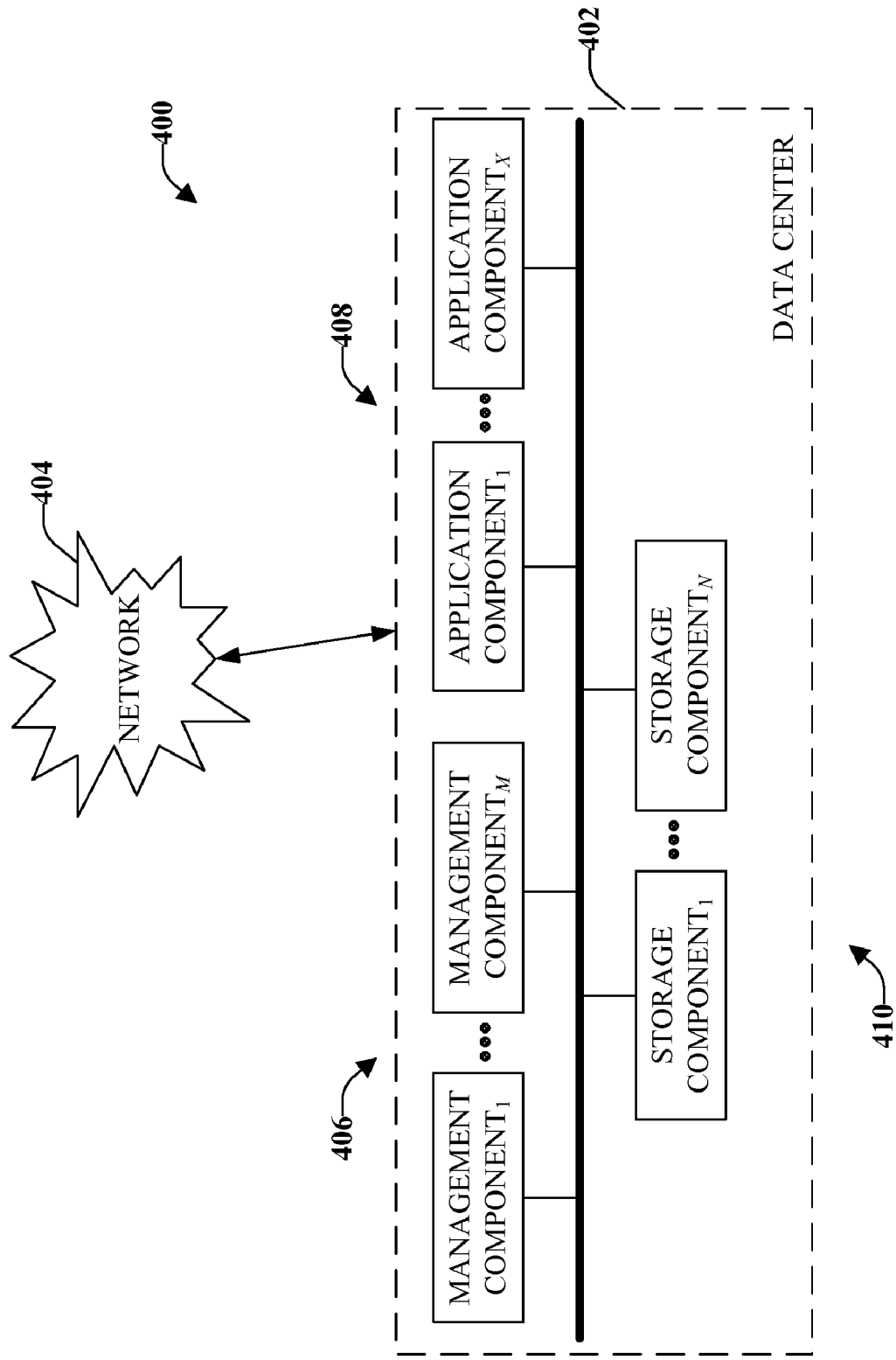
FIG. 4 illustrates a network system in accordance with one or more of the disclosed embodiments.

FIG. 4 illustrates a network system 400 in accordance with one or more of the disclosed embodiments. System 400 can include one or more data center(s) 402, of which only one is shown for simplicity purposes. Data center 402 can be connected to a network 404 (e.g., local area network (LAN), a wide area network (WAN), a metropolitan area network (MAN), and the like) through a wired or wireless connection.

Data center 402 can include one or more management components 406, labeled as Management Component$_1$ . . . Management Component$_M$. One or more application components 408, labeled as Application Component$_1$ . . . Application Component$_X$. Also included in data center 402 can be one or more storage components 410, labeled as Storage Component$_1$ . . . Storage Component$_N$. Where M, N, and X are integers greater than or equal to one. Management components 406 can be connected to one or more storage components 410 through a network, such as a Gigabit Ethernet type, or through a Fiber Channel switch or a SCSI switch, for example. While application components 408 are illustrated as located in data center 402, they can be located at various places within system 400, such as on the data center, near the edge close to the clients, on the clients, etc.

Management components 406 can operate on a clustered file system with distributed locking for consistent access to the entire storage from any of the management components 406. This single system image, as viewed from the management components 406 can enhance system management. Management components 406 within system 400 can have a single IP address. Thus, a user can communicate with one or a plurality of management components 406 through a network connection using the virtual IP address of the management components 406 to request data. In some embodiments, at substantially the same time as a user request is received, management components 406 can authenticate the user, through, for example, a user identification password pair, or other recognition and/or authentication means. Management components 406 can load balance the user requests among themselves to determine the application component(s) 408 that can deliver the user request efficiently and provide the best performance for the user. For example, management components 406 can provide load balancing and failover among themselves using heartbeat and/or other commonly available IP load balancing methods. Using commodity redundant hardware mitigates the existence of a single point of failure in the system 400, thus, reducing downtime and increasing system confidence.

Management components 406 can send one or more control messages to the application components 408, which can then serve the file or requested information directly to the user. At substantially the same time as sending the request to the application components 408, the management components 406 can temporarily relinquish control of the data transfer, minimizing the load on the management components 406. Application components 408 can communicate directly with storage components 410 to obtain the requested information. System 400 can utilize commodity network attached storage (NAS) servers for physical storage and, thus, needs minimal, if any, modification on the NAS devices. The caching servers can be located on any machine on the network including the data center, network edge, and on the client itself, and do not require modification of the client application software. System 400 provides a centralized management of all storage resources.

Application components 408 can be loosely coupled servers and can be located any place on the network, depending on where performance scaling is necessary. For example, performance scaling of a data center 402 can be achieved by installing application server software on a data center machine allowing utilization of unused server resources, such as memory, network bandwidth, CPU processing power, etc. The data center machine can run any supported operating system.

Application components 408 can be peer-to-peer (P2P) networks and can communicate among each other and to management components 406. An application server file cache can be populated through various techniques. For example, it can be populated by pushing data from management components 406 based on user set criteria, on demand caching using frequently used files or recently added files, direct access to the storage components 410, etc. Store and forward mechanisms can also be utilized to populate the file cache, thereby reducing the load and traffic on the management components 406.

Control messages sent from the management components 406 to the application components 408 can contain information, such as, for example, file identifier, checksum, offset, length, source IP address, client IP address, data associated with the client, data associated with the requested information, data associated with the management component, etc. Application component 408 can construct a packet using the information and the file data to send the packet to the user. A technique known as spoofing can be utilized so the client does not know that the packet originates from application component 408, but rather it appears as if the packet originated from the management component 406. Utilizing spoofing provides that client applications need minimal modification to receive data directly from application components 408.

Placement of application components 408 strategically within system allows desired performance benefits to be obtained since the control messages are very small in size compared to the size of the fully constructed packet. Placement can also reduce the load on the management components 406 since the management components 406 do not need to access data from the storage components 410. In addition, a CPU associated with respective management components 406 is not needed for constructing the packets with file data.

Figure 5:
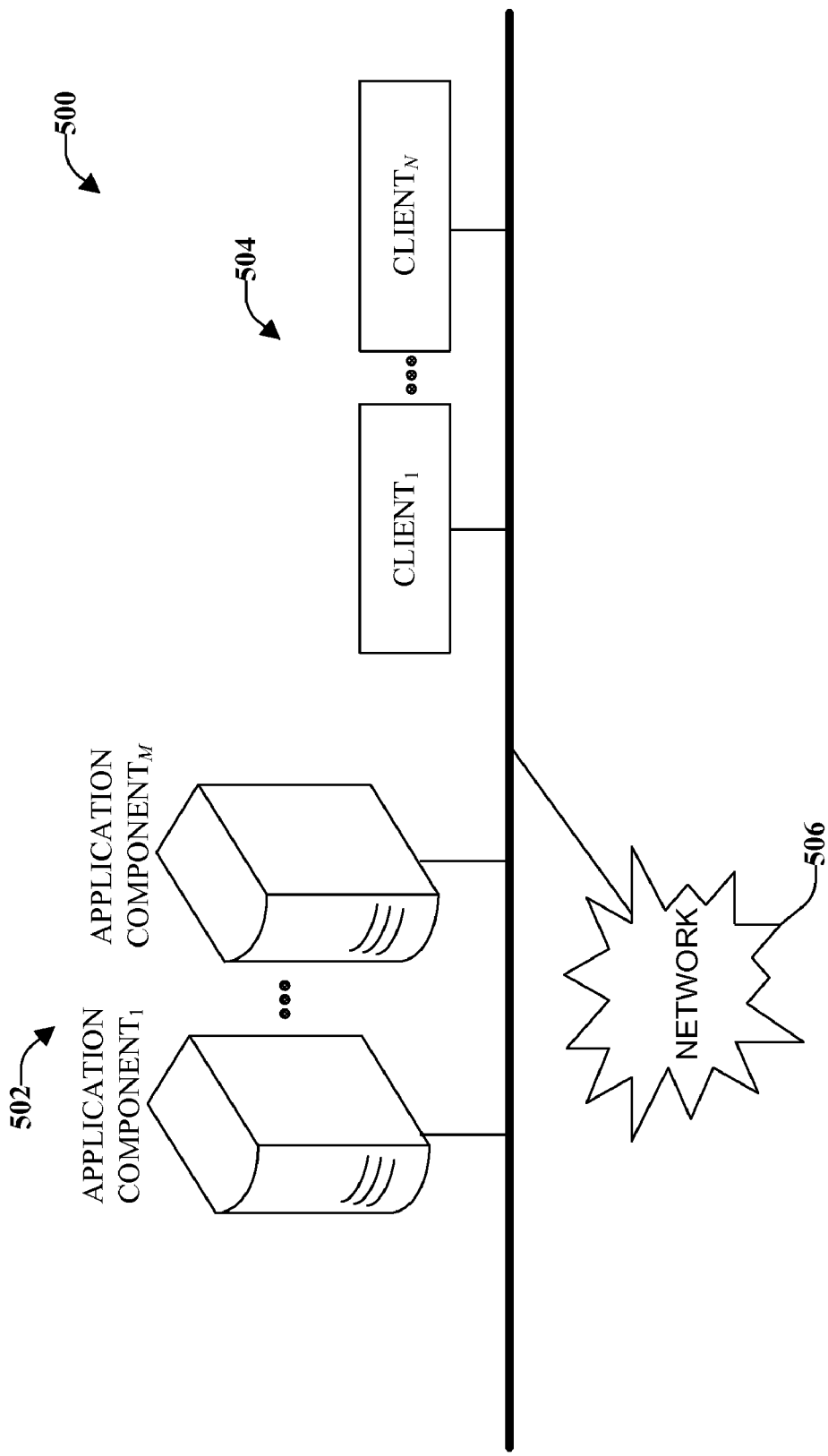
FIG. 5 illustrates another network system in accordance with one or more of the disclosed embodiments.

FIG. 5 illustrates another network system 500 in accordance with one or more of the disclosed embodiments. System 500 includes a plurality of application components 502 (labeled Application Component$_1$ ... Application Component$_M$) and clients 504 (labeled Client$_1$ ... Client$_N$), where M and N are integers greater than or equal to one. Application components 502 can be servers and can be located close to clients 504. In some embodiments, application components 502 can be located near the network edge to relieve network congestion. Clients 504 and application components 502 can communicate through a network 506, such as a LAN, WAN, MAN, etc.

Application components 502 can receive a control message from a management component (not shown), thus network traffic between a data center (not shown) and the client(s) 504 can be reduced. The application components 502 can serve the requested data from their cache or retrieve it directly from the storage devices.

Figure 6:
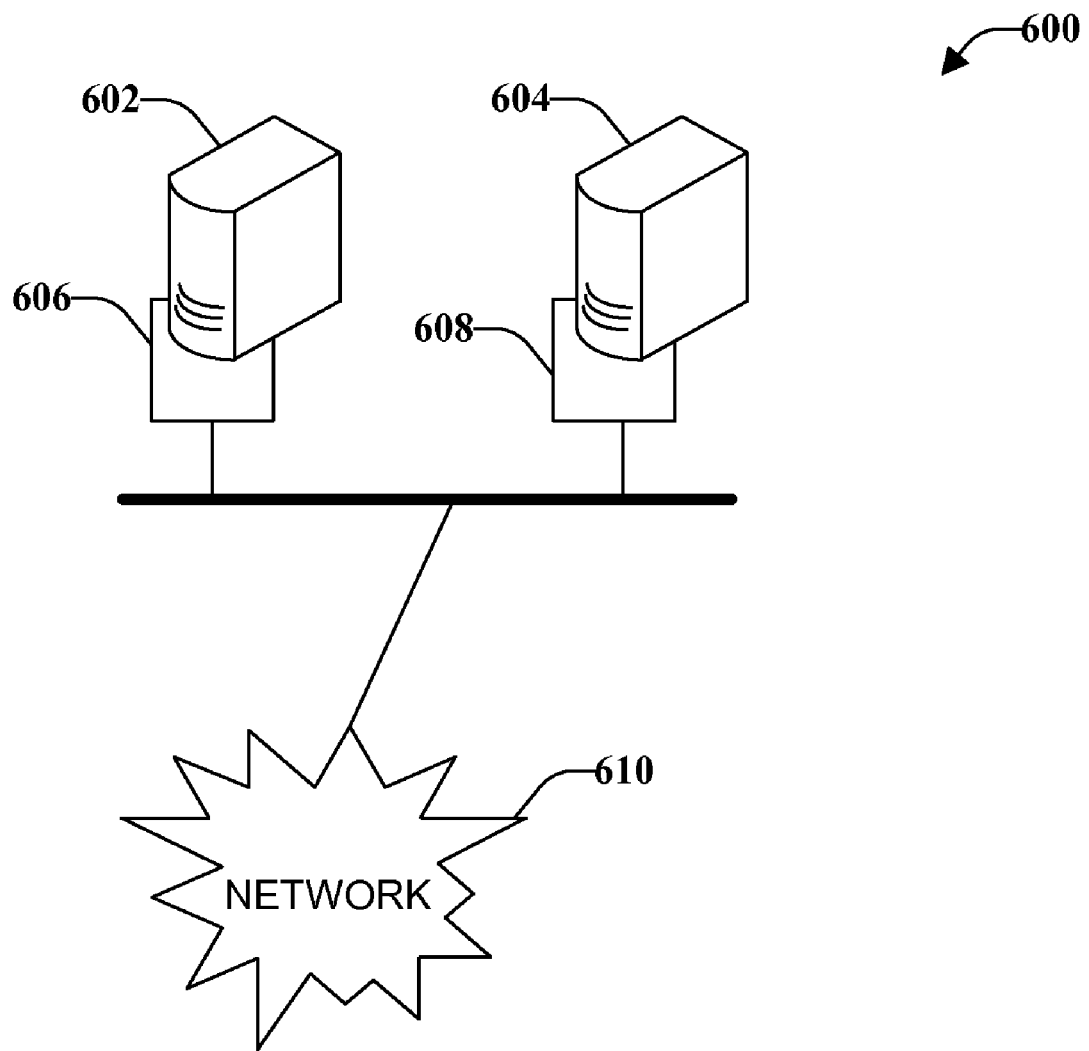
FIG. 6 illustrates another network system in accordance with one or more of the disclosed embodiments.

FIG. 6 illustrates another network system 600 in accordance with one or more of the disclosed embodiments. System can include one or more application component servers 602 and 604 located or installed on respective storage clients 606 and 608. It should be understood that while two application servers 602 and 604 and two storage clients 606 and 608 are shown, system 600 can include less or more of either component. System 600 can obtain optimal performance while mitigating network traffic when application servers 602 and 604 are installed on the storage client 606 and 608. In this configuration, control messages are utilized to start and end a file transfer based upon a user request. Application servers 602 and 604 and clients 606 and 608 can be connected to a network 610, such as a wired network and/or a wireless network.

One or more primary servers (not shown) can instruct either or both application servers 602 and 604 on the clients 606 and 608 to begin sending the file at the beginning of the file transfer. When application servers 602 and 604 receive the command to send the file, application servers 602 and 604 take over the connection between client 606 and 608 and primary server(s). Primary server(s) waits for a message from both application servers 602 and 604 (if both are utilized to supply the requested information) indicating that a successful file transfer is complete. Upon successful completion of file transfer, application servers 602 and 604 send respective control messages to primary server (not shown) and relinquish control of the connection to the client to the primary server. As the file is transferred from the client machine, it can exceed the file transfer rate of conventional network transfer rates. The positioning of the application server 602 and 604 on the client 606 and 608 mitigates traffic between the client(s) 606 and 608 and the primary server for the file transfer.

In some embodiments, a centralized administrator user interface can be utilized with system 600. With a centralized administrator user interface, the file system can be expanded without the addition of new storage devices. The expansion occurs with no need for unmounting the storage volume, thus reducing downtime. This also increases system confidence because future needs can be handled by the expansion of the current system.

The use of multiple application servers 602 and 604 allows system 600 to be scalable and should have no single point of failure. Heartbeat messages can be sent between the primary servers to ensure system health and enabling failover mechanisms when a system fails. Failover is a backup system that automatically switches to a standby database, server or network if the primary server fails or is temporarily out of service.

The application servers 602 and 604 perform the actual delivery of the data directly to the client, keeping the load on the primary servers to a minimum. System does not require modification on the client for the client to be able to receive data directly from the application servers. By locating the application servers in performance bottleneck regions, storage delivery performance can be enhanced.

The method of delivery can place the application servers in the same physical network as the primary servers to aggregate network bandwidth without requiring expensive specialized network cards or computer complicated setup operations. Since the application servers are in the same physical network, they can directly access the storage devices, thereby increasing storage read performance.

The primary servers can run in a clustered environment having a single system image of the entire storage and other system resources of all the clustered computing elements.

System can be optimized for write once read many (WORM) data eliminating the need for complicated distributed locking and versioning. Distributed locking ensures consistency and concurrency while allowing simultaneous read and write access of data from any of the primary servers. Failover is supported in the clustered environment. For example, when one of the primary servers fails, another can take over its functionality. Additionally, the primary servers can support virtual IP and/or IP load balancing as well as application load balancing.

The file system on the primary servers typically can also support dynamic addition and removal of storage devices. The resizing of the file system can be supported by means of an underlying device support using internet shared small computer system interface (iSCSI) or through hierarchical storage management interfaces. Thus providing scalability of the capacity of the storage system.

Figure 7:
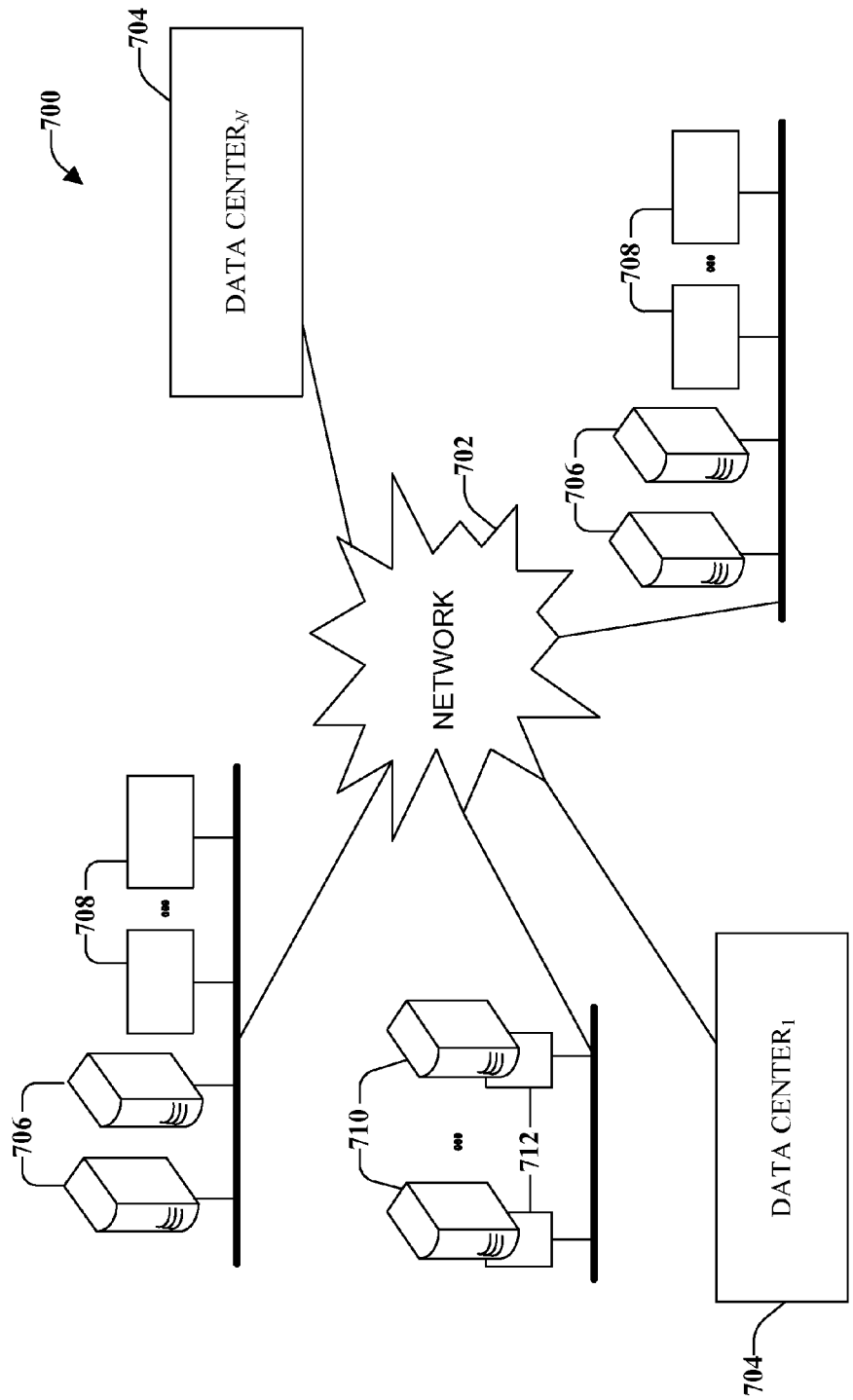
FIG. 7 illustrates a system that provides scalable distributed storage and delivery.

FIG. 7 illustrates a system 700 that provides scalable distributed storage and delivery. System 700 can be utilized with a plurality of wired and/or wireless networks 702 (e.g., WAN, LAN, PAN, . . . ). System 700 can include a plurality of data centers 704 (labeled Data Center$_1$ and Data Center$_N$) that include primary servers, application servers and storage servers. Also included in system can be application servers 706 located near the edge of the network, close to the clients 708 and/or application servers 710 located on the clients 712.

System 700 provides a scalable distributed storage system utilizing commodity storage devices, thus requiring little, if any, modification on the existing storage hardware or storage clients. System 700 can utilize a combination of primary servers and application servers to deliver data to the storage client. When a client or user requests a file or other data from a primary server, the primary server can authenticate the client (if desired) and determine a set of application servers that can deliver the requested data to the user. The file data can be served to the client transparently from the application servers with no modification on the client. The application servers can read the file content from their local cache or retrieve it directly from the storage devices. The primary servers can have a clustered file system with distributed locking. This provides a single system image for all the primary servers. The virtualization can be performed on the primary servers with no modification required on the storage devices. The primary servers can access the storage devices utilizing industry standard protocols.

Figure 8:
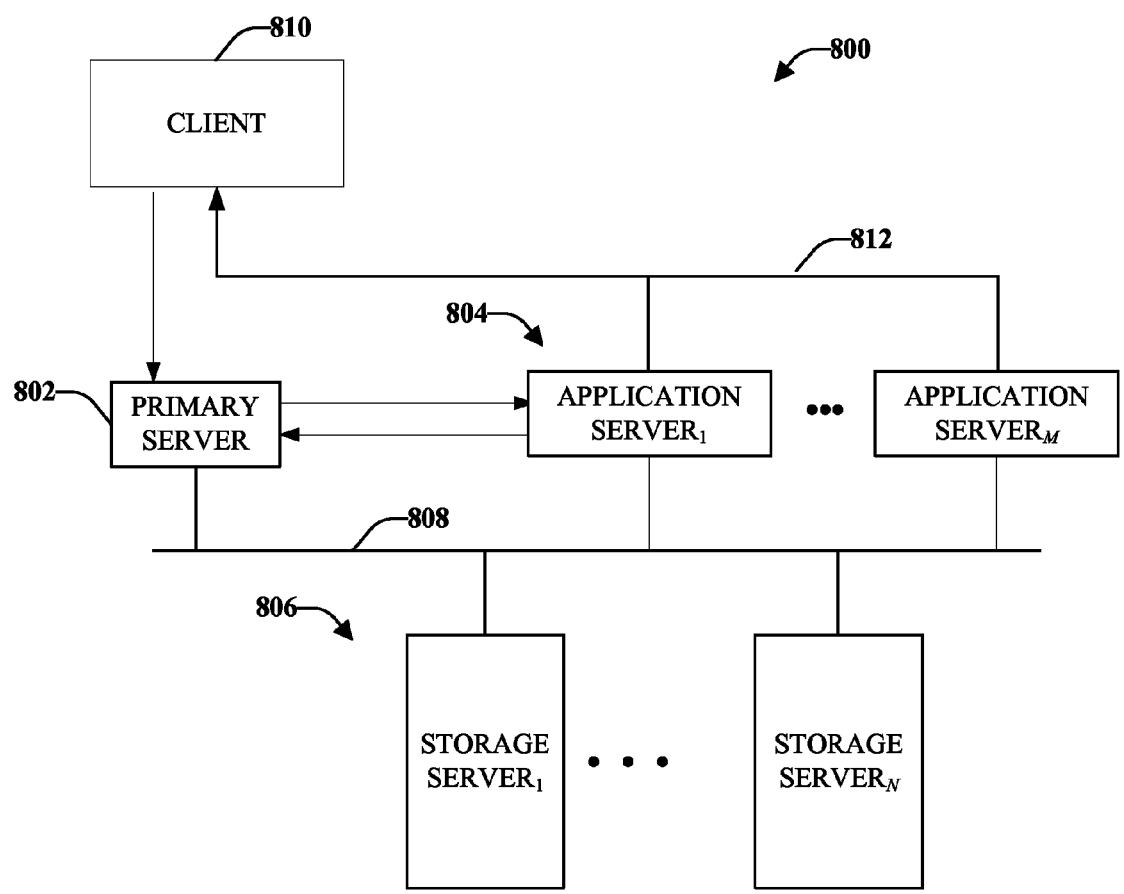
FIG. 8 illustrates a system having an application server located in a data center in accordance with the disclosed embodiments.

FIG. 8 illustrates a system 800 having an application server located in a data center in accordance with the disclosed embodiments. System 800 includes a primary server 802 and from one to M number of application servers 804 (labeled Application Server$_1$ . . . Application Server$_M$), where M is an integer greater than or equal to one. Also included can be one or more storage servers 806 (labeled Storage Server$_1$ . . . Storage Server$_N$), where N is an integer greater than or equal to one. Primary server 802, application server(s) 804, and storage server(s) 806 can be connected to a network backbone 808, for example.

A user and/or client 810 can input a request for a file, data, information, etc. to primary server 802. According to some embodiments, upon receipt of the user request, primary server 802 authenticates client 810. The authorization can be based on various criteria or parameters (e.g., user identification, user password, and the like). Primary server 802 can also determine which application server(s) 804 are available and capable of handling the user request. For example, primary server 802 can send a signal or message to a plurality of application servers 804 and, depending on the response received identify the appropriate application server(s) 804.

The response received can provide primary server 802 information regarding which application server(s) 804 are available and which are not available. Such determination can be based on not receiving a response from a particular application server 804 or receiving a slow or delayed response from a particular application server 804. It will be understood by those having ordinary skill in the art that primary server 802 can make a determination of appropriate application servers 804 based on other criteria (e.g., busy response, . . . ).

When the appropriate application server(s) 804 is identified, primary server 802 sends a control message that transfers control of the user request from primary server 802 to application server(s) 804. The control request can contain information such as a file identifier that identifies the file or other data requested by the user and/or a checksum for error verification. Alternatively or in addition, the control request can include an offset, length, source IP address, client IP address, mapping, or other information associated with the user and/or requested information.

Application server(s) 804 can access storage server(s) 806 to retrieve the user requested data. Alternatively or in addition, application server(s) 804 can access storage through the primary server 802 and/or directly based on mapping provided by primary server 802. In some embodiments, application server(s) 804 can access the user requested data through conventional or peer-to-peer methods.

At substantially the same time as the information is retrieved, application server(s) 804 can reply to client 810 by sending a data packet to the client 810, shown by data path 812. The data packet can be constructed utilizing the information and the file data. Additionally or alternatively, application server(s) 804 can utilize a technique, known as spoofing, to make it appear to the client that the information is being sent by the primary server 802. In such a manner the client 810 is not aware that it is the application server(s) 804, not the primary server 802, responding to the request. Spoofing provides that there is minimal, if any, modification on the client applications in order for the client 810 to receive information from application server(s) 804.

Application server(s) 804 can also send a message or reply to primary server 802. Upon receiving the reply, primary server 802 determines if the file or data transfer is complete. The transfer may not be complete if the file is split among two or more application server(s) 804 and one or more application server(s) 804 has not provided its portion of the requested information. It will be understood by those having skill in the art that dividing or splitting the file among two or more application server(s) 804 allows the servers to send the file or portions of the file at substantially the same time. If the primary server 802 determines that the file transfer is not complete, it sends a request to the same or a different application server 804 for completion of the file request.

Figure 9:
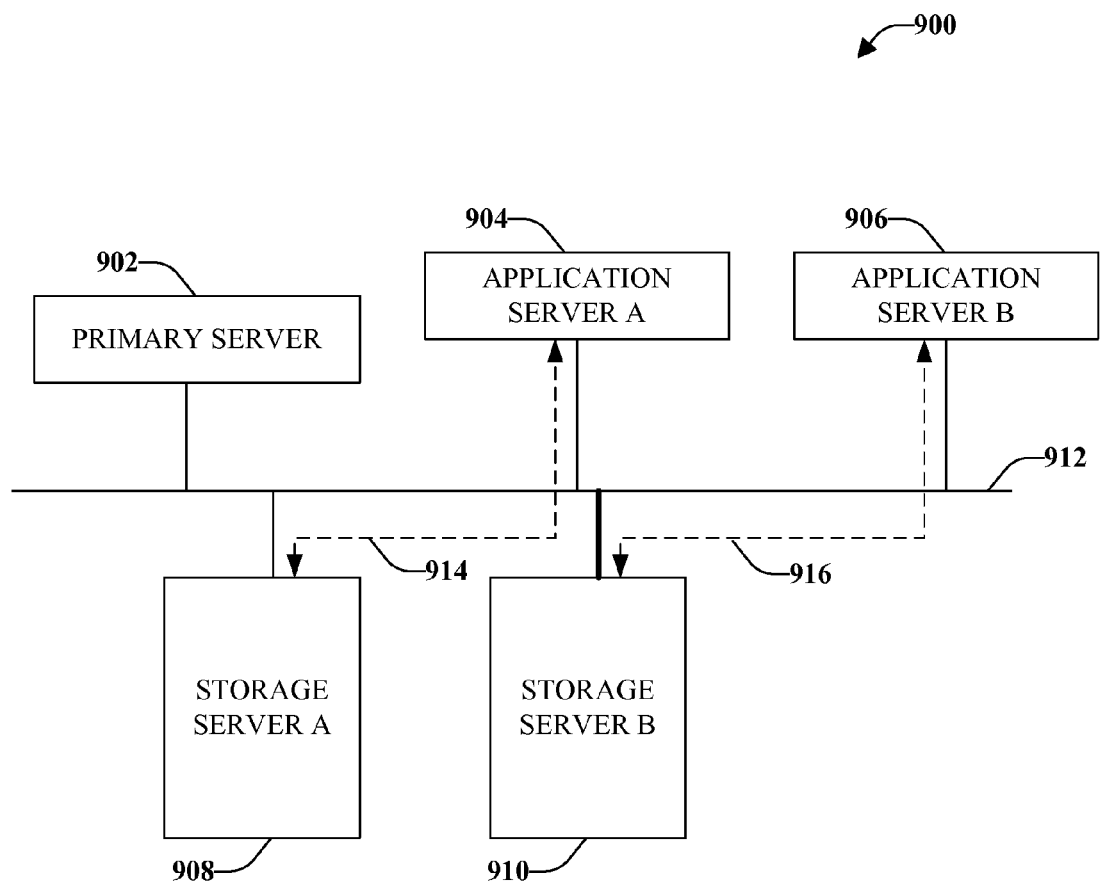
FIG. 9 illustrates a system for reading from multiple storage devices.

FIG. 9 illustrates a system 900 for reading from multiple storage devices. System 900 includes a primary server 902, an application server A 904, an application server B 906, a storage server A 908, and a storage server B 910, all connected to a network backbone 912, for example. Although a number of application servers and storage servers can be included in system 900, as will be appreciated, two application servers 904 and 906 and two storage servers 908 and 910 are illustrated for purposes of simplicity.

Primary server 902 can receive a request from a user and transfer the request to one or more application servers 904 and 906, which can be loosely connected by means of a network connection. At substantially the same time as primary server 902 transfers the request temporary control of the request is relinquished to application servers 904 and 906. Application servers 904 and 906 can be, for example, computer elements with a storage unit, processing unit, memory unit, and/or a network unit.

According to some embodiments, application server A 904, while processing the request, can communicate with storage server A 908 through a data path 914. Likewise, application server B 906 can communicate with storage server B 910 through data path 916. In this manner, each application server 904 and 906 is communicating with a separate storage server 908 and 910. While the data paths 914 and 916 are shown as a direct path between application servers 904 and 906 and storage servers 908 and 910, it should be understood that application servers 904 and 906 can access storage servers 908 and 910 through primary server 902 or directly based on a mapping provided by primary server 902.

Figure 10:
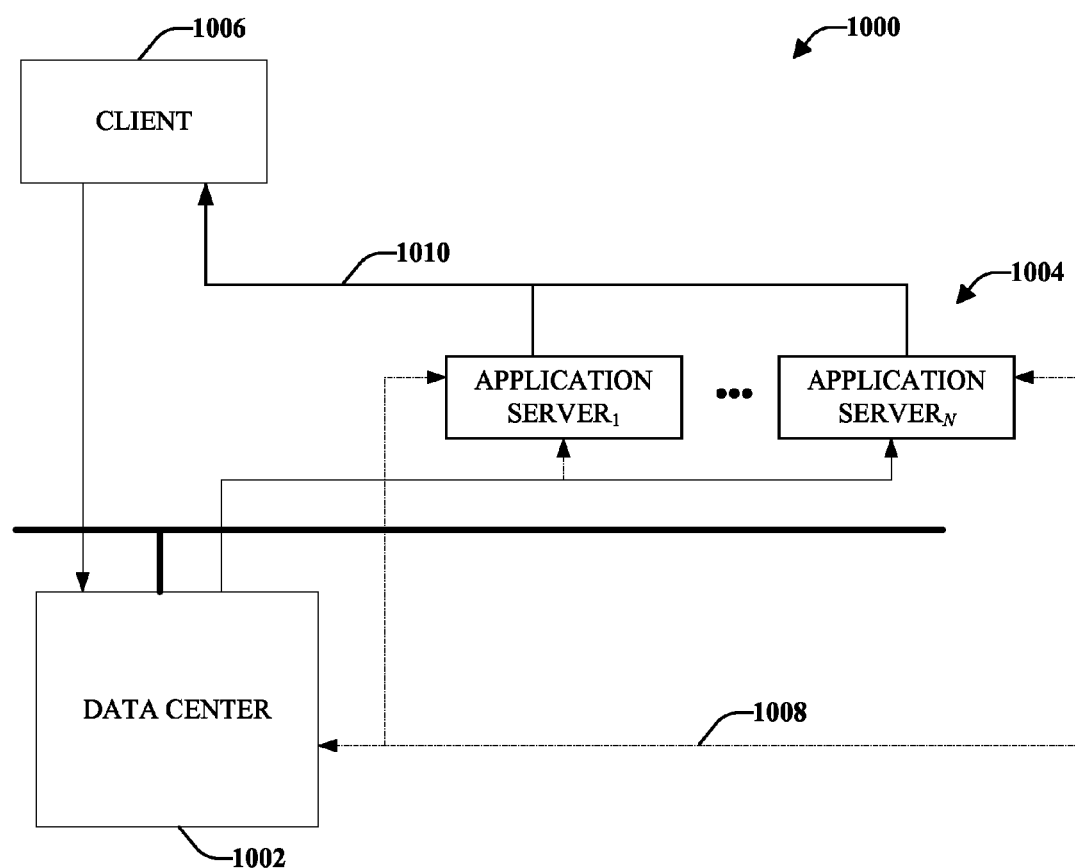
FIG. 10 illustrates a system that includes an application server in a sub-network.

FIG. 10 illustrates a system 1000 that includes an application server in a sub-network. System 1000 can include a data center 1002 and between one and N application servers 1004 (labeled Application Server$_1$ and Application Server$_N$), where N is an integer greater than or equal to one. A client 1006 can request information (e.g., files, data, database, . . . ) through a direct interface to data center 1002. Data center 1002 can be configured to communicate with application server(s) 1004 and transfer control of the connection to the application server(s) 1004, through, for example, a data path 1008. Application server(s) 1004 can be configured to process the request. At substantially the same time as the requested information is retrieved, application server(s) 1004 can transmit the information to the client 1006, through data path 1010. The client 1006 can be unaware that it is the application server(s) 1004 who transmitted the information and not the data center 1002 through a spoofing technique. At substantially the same time as the application server(s) 1004 transmit the information to client 1006, control is returned to data center 1002 and normal operation is resumed (e.g., processing of user requests through data center 1002).

Figure 11:
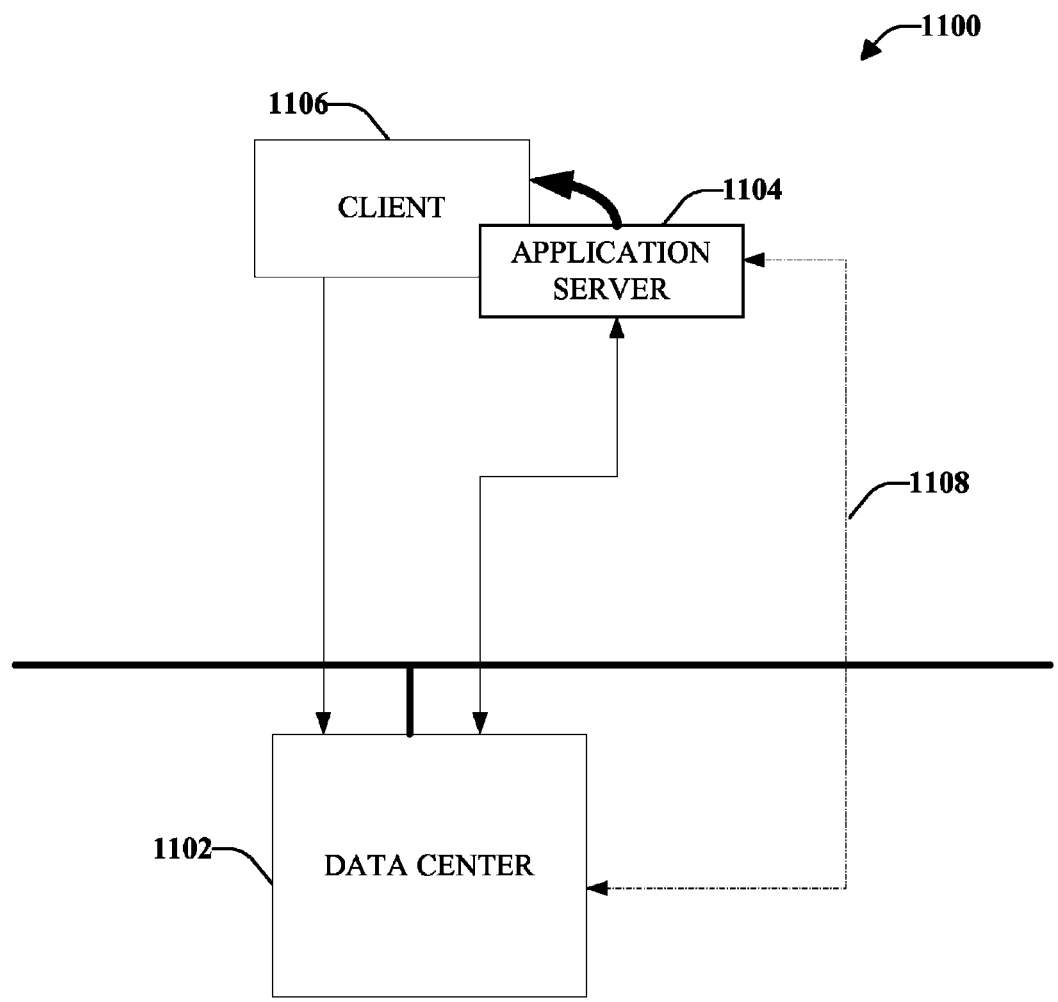
FIG. 11 illustrates a system with an application server located on a client in accordance with the one or more embodiments disclosed herein.

FIG. 11 illustrates a system 1100 with an application server located on a client in accordance with the one or more embodiments disclosed herein. System includes a data center 1102 and an application server 1104 that communicates with a client machine 1106. As illustrated, application server 1104 can be located on the client machine 1106. Application server 1104 communicates with both the data center 1102 and client application 1106. An application server can be located anywhere on a network and should have appropriate security permissions. If further performance improvement is desired, application server can be installed on the client computer.

Data center 1102 can include one or more primary servers, one or more application servers, and one or more storage servers. When the client application 1106 sends a data request to the primary server located in data center 1102, the primary server acknowledges the request and, according to some embodiments, authenticates the client. The client 1106 can have an application server 1104 installed and if the application server 1104 has the file cached, the primary server located in the data center 1102 sends information to the application server 1104 through, for example, a data path 1108. At substantially the same time, the application server 1104 takes over the connection and obtains the file or data from, for example, a storage server. Once the data retrieval is complete, the application server 1104 sends a packet to the client 1106. The client 1106 receives the packet and acknowledges it by sending an acknowledgement to the application server 1104. Once the file transfer is complete, the application server 1104 relinquishes control back to the primary server located in the data center 1102. If the file is not complete, the primary server may send another request to the same application server or another application server to complete the request.

Figure 12:
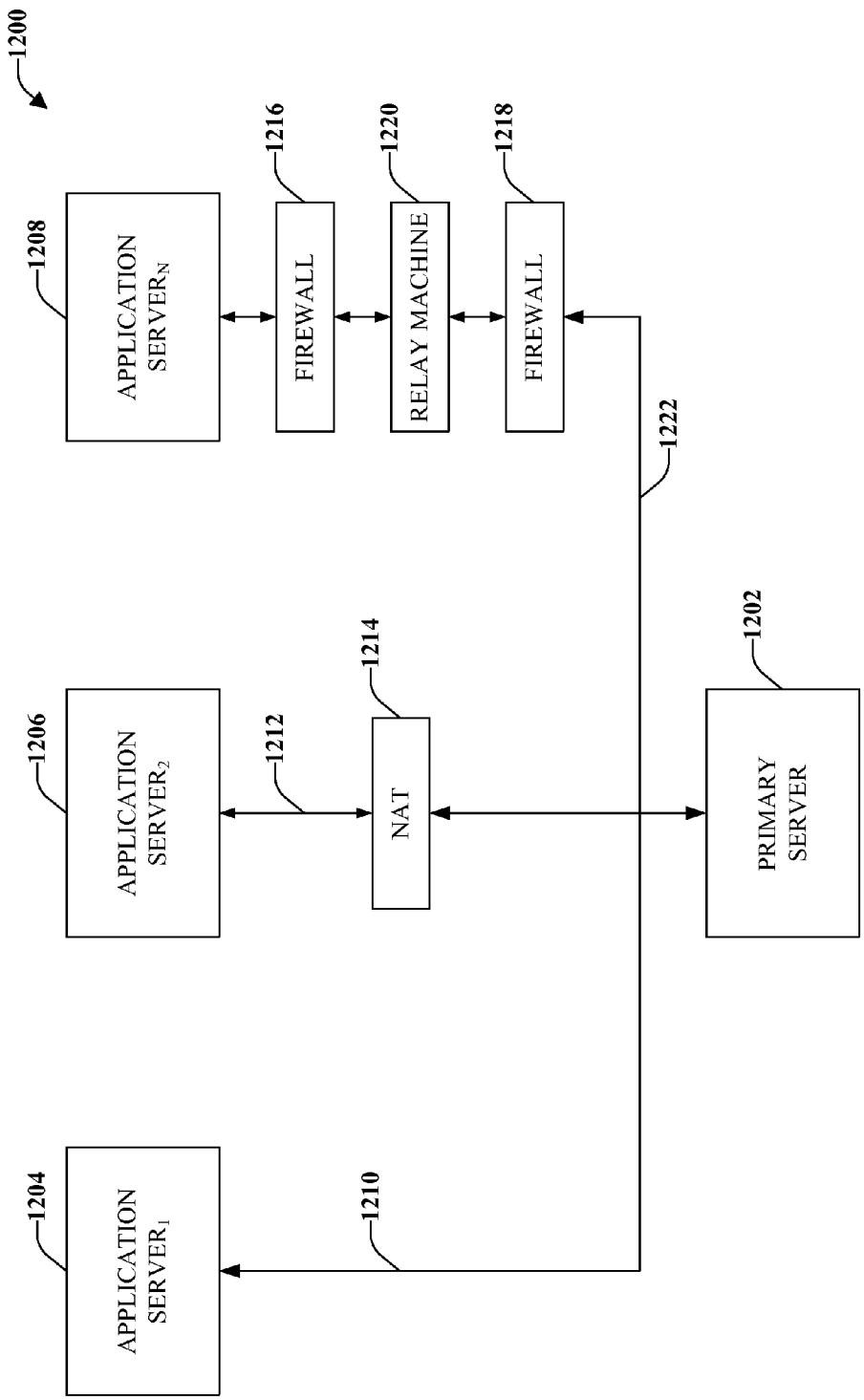
FIG. 12 illustrates a system that can communicate through Network Address Translation (NAT) and firewall devices according to the various embodiments disclosed herein.

With reference now to FIG. 12, illustrated is a system 1200 that can communicate through Network Address Translation (NAT) and/or firewall devices according to the various embodiments disclosed herein. System 1200 includes at least one primary server 1202, and one or more application sever where Application Server$_1$ 1204, Application Server$_2$ 1206, and Application Server$_N$ 1208 are shown, where N is an integer greater than or equal to one. The various servers 1202, 1204, 1206, and 1208 can communicate in the absence or presence of one or more firewall. A firewall can be hardware or software and is a system or combination of systems that protect against threats from outside the firewall.

As illustrated, Application Server$_1$ 1204 interfaces with primary server 1202 through data link 1210 in the absence of any communication devices (e.g., there is a direct connection). Application Server$_2$ 1206 initiates a connection at 1212 to communicate with primary server 1202 through a Network Address Translation (NAT) device 1214. An NAT enables a local area network (LAN) to use one set of IP addresses for internal traffic and a second set of address for external traffic, allowing the internal address to be shielded from the public Internet.

Application Server$_N$ 1208 is shown as interfacing with primary server 1202 through two firewalls 1216 and 1218 and a relay machine 1220. The connection 1222 is maintained using the public relay machine 1220. System 1200 can be configured to analyze the firewalls 1216 and 1218 that may be present and make a determination as to an efficient manner of communication between the servers 1202 and 1208. A resulting communication can use TCP or UDP with known or dynamically created ports, depending on the type of firewall(s) that may exist between servers 1202, 1204, 1206, and 1208.

Figure 13:
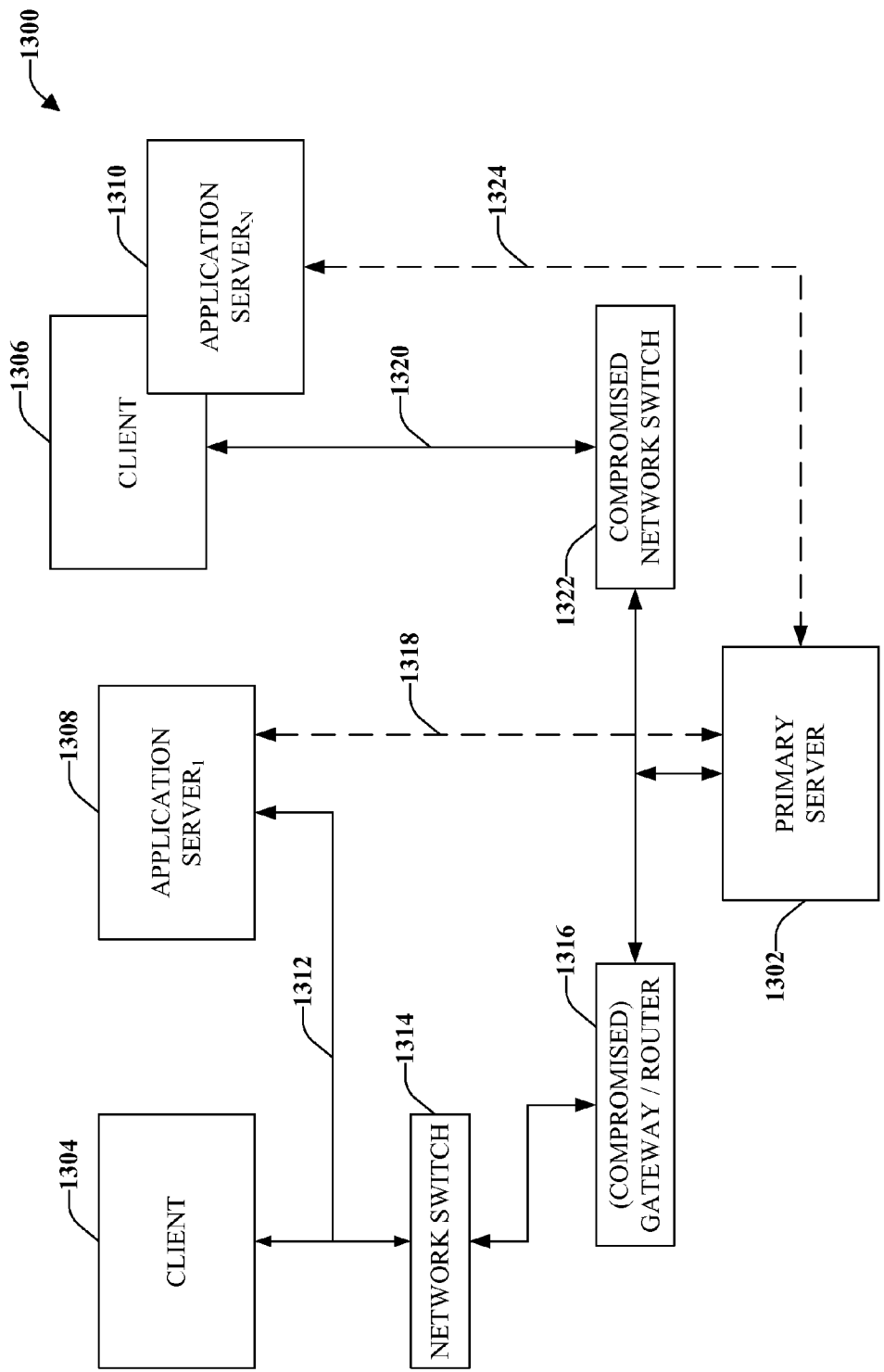
FIG. 13 illustrates a system that can communicate through secure links according to one or more of the disclosed embodiments.

FIG. 13 illustrates a system 1300 that can communicate through secure links according to one or more of the disclosed embodiments. System 1300 can be configured to provide a secured link for information communicated between a server(s) and a client(s). A secured link can be desired in a variety of circumstances and since viruses have been written for network routers, there exists no safe place where communication can occur without the potential of being intercepted and/or eavesdropped.

System 1300 includes at least one primary server 1302, one or more clients 1304 and 1306, and one or more application servers 1308 and 1310. It should be understood that while two clients 1304 and 1306 and two application servers 1308 and 1310 are illustrated, system 1300 can include more or fewer clients and/or application servers. Through utilization of application servers 1308 and 1310 that are close to the client 1304 and 1306, the actual data transmission uses only the switches and/or routers that are most likely on the same sub network as the client 1304 and 1306.

For example, as illustrated, application server$_1$ 1308 is close to client 1304 and communicate through link 1312, and as illustrated, can be in the same sub network. Client 1304 and/or application server$_1$ 1308 can communicate with primary server 1302, through, for example, a network switch 1314 and a gateway/router 1316. If system 1300 detects, infers, is notified, etc. that gateway/router 1316 is compromised, a notification is sent to the client 1304, primary server 1302 and/or application server 1308. Client 1304 can communicate through application server$_1$ 1308 to primary server link 1302 through data link 1318, bypassing the compromised gateway/router 1316. Thus, the application server 1308 takes over the communication between client 1304 and primary server 1302. Data link 1318 is a secure communication link.

Another example is an Application Server$_N$ 1310 that is located in client 1306. Client 1306 can communicate with primary server 1302 through a link 1320 that includes a network switch 1322. If system 1300 detects, infers, is notified, etc. that network switch 1322 has been compromised, the network switch 1322 and link 1320 is no longer utilized for communication between client 1306 and primary server 1302. A notification of the compromise can be sent to the client 1306, primary server 1302 and/or application server 1310. Instead, Application Server$_N$ 1310, located on client 1306, takes over the communication between client 1306 and primary server 1302 through data link 1324, which is a secure communication path.

Utilizing routers and switches that are closer to the client 1304 and 1306 can minimize the effort needed to secure the network path between the server 1302 and the client 1304 and 1306. In such a manner, a virus or "man in the middle" might not be able to see or be aware of a file content transfer between the client 1304 and 1306 and the server 1302 since it is being served from the application server 1308 and 1310.

Figure 14:
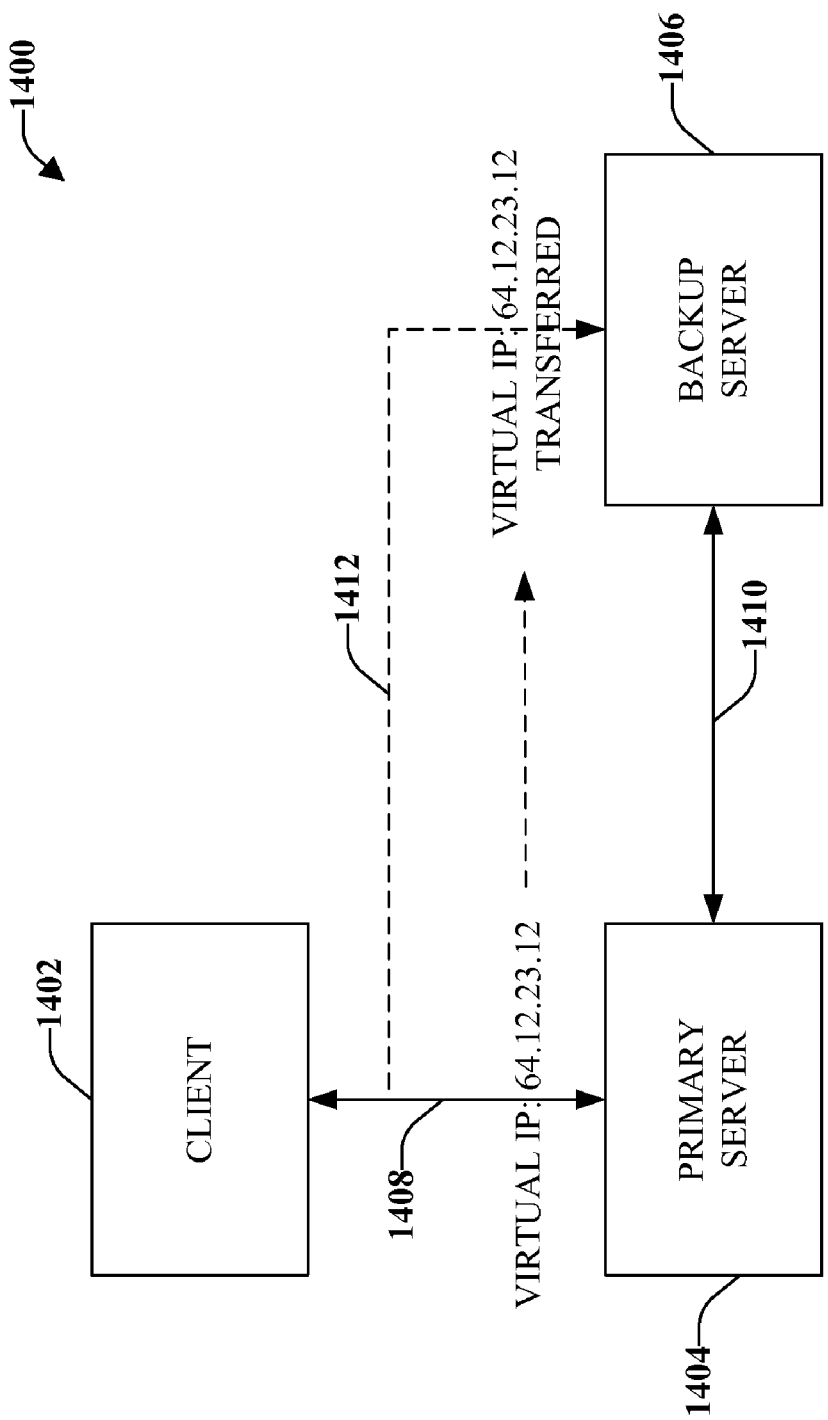
FIG. 14 illustrates a system that can provide disaster recovery through IP transfer according to the various embodiments.

FIG. 14 illustrates a system 1400 that can provide disaster recovery through IP transfer according to the various embodiments presented herein. System 1400 includes a client 1402, a primary server 1404, and a back up server 1406. While only one of client, primary server, and back up server are shown, it should be understood that more than one of each can be included in system 1400. Client 1402 can access primary server 1404 utilizing a virtual IP address (e.g., Virtual IP: 64.12.23.12), this communication link is shown by arrow 1408. The information available or maintained by primary server 1404 can be duplicated or mirrored on a back up site, such as backup server 1406 through communication link 1410. Backup server 1406 and primary server 1404 can share information through this communication link 1410, thus maintaining the accuracy and integrity of both servers 1404 and 1406.

System 1400 can be configured to intelligently manage the virtual IP address by, for example, a network switch (not shown). If sufficient replication is performed between the primary server 1404 and a back up site or server 1406, through communication link 1410, the system 1400 (e.g., network switch) can redirect the network traffic to the back up server (site) 1406 if a problem develops with the primary server 1404. System 1400 can perform the transfer from primary server 1404 to backup server 1406 automatically and autonomously when system 1400 becomes aware of a problem through various techniques. Thus, client 1402 rather than communicating with primary server 1404 through data link 1408, is now communicating with backup server 1406 through communication link 1412. Thus, client 1402 can utilize the backup site 1406 without service disruption and even without client 1402 needing to know that it is the backup server 1406 and not the primary server 1404 that is servicing client 1402. Backup server 1406 can perform the necessary notification to claim ownership of the virtual IP address, so that there is only one site with the virtual IP.

In view of the exemplary systems shown and described above, methodologies, which may be implemented in accordance with one or more aspects of the various embodiments, will be better appreciated with reference to the diagram of FIGS. 15-19. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Moreover, not all illustrated acts may be required to implement the following methodologies. Those skilled in the art will understand and appreciate that a methodology could alternatively be represented as a series of interrelated states or events, such as in a state diagram.

Figure 15:
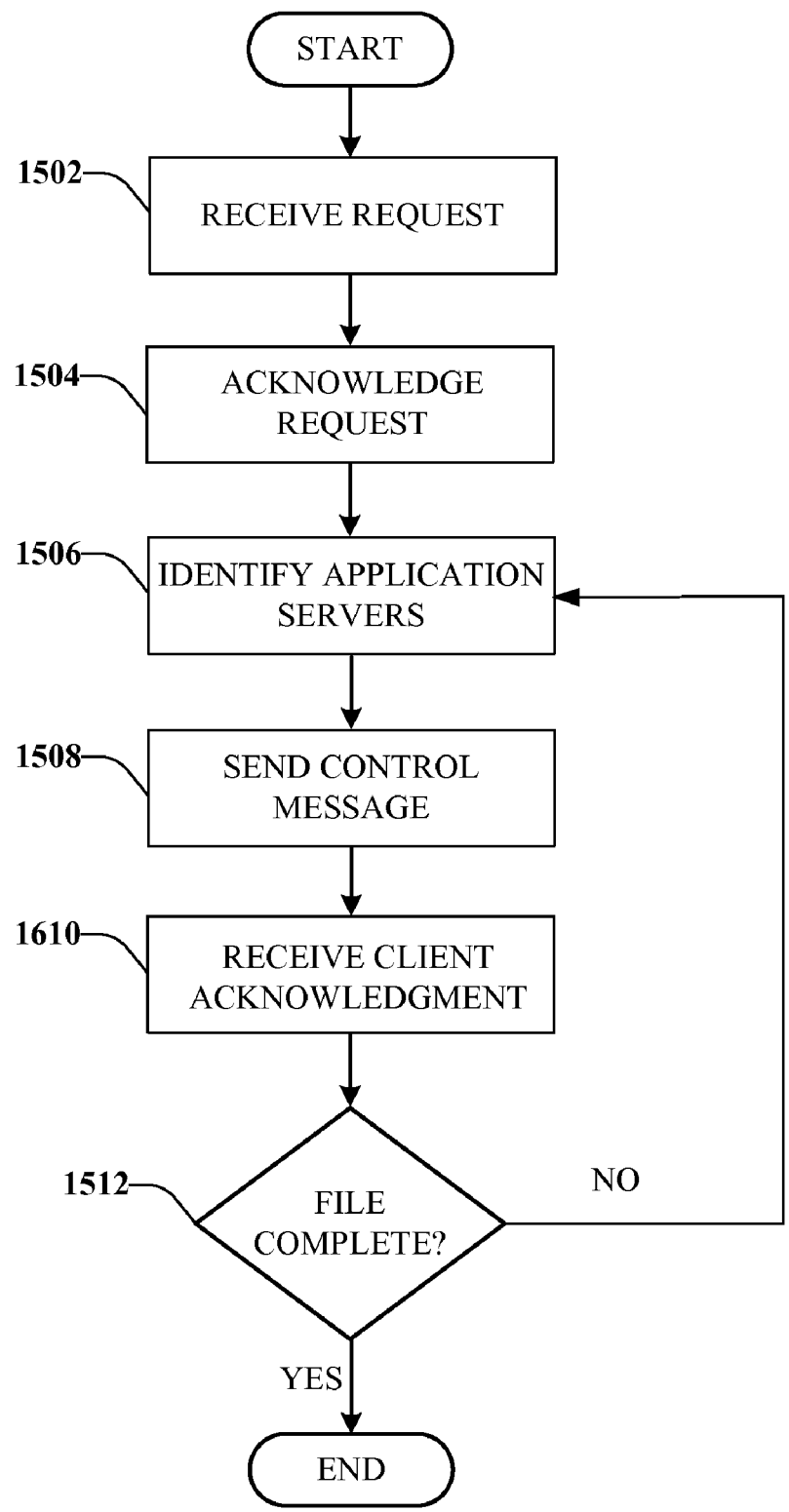
FIG. 15 illustrates a methodology for providing scalable distributed storage and delivery.

FIG. 15 illustrates a methodology 1500 for a network application server software. The method starts at 1502 when a user request is received. The request can be for a file, data, or other information. The request can be received through a secure communication and in the absence or presence of firewalls. At 1504, the request is acknowledged. The user may also be authenticated as a user authorized to request information utilizing any known authorization means (e.g., from a database or a file). The request is then parsed to identify the file that should be served.

Generally, the network application server software at this point reads the file and serves it to the client in the form of packets. However, these may not be scalable for various reasons including, for example, there is a limit on the number of concurrent connections that the network application server software can have at any point in time. Additionally, reading files from the disk is a slow operation and reduces performance of the system. To deliver data from machines close to the client and with data read from multiple sources without any modification on the client or network infrastructure, the method continues at 1506, where one or more application servers are identified that can handle the request. At substantially the same time, a control message is sent at 1508 to the identified application servers. The application server software can be implemented as a user-level server background process, which continuously listens for incoming messages. The control message packet is significantly smaller in size compared to a fully constructed packet with file data and is also computationally less intensive to generate.

The application server can read the control packet and forms a packet with the file data read from a storage device. With the use of caching, the data can be read from the local storage unit. The application server sends the packet to the client with the primary server address (or backup server address, which is the IP address transferred from the primary server) as the source IP address. It should be noted that the application server should need access to only parts of the file in order to be useful. Various hashing algorithms and striping algorithms can be used to store and retrieve parts of the file on the application servers while optimizing performance. At substantially the same time as the client receives the packet, it sends an acknowledgment, which is received at 1510.

If a client acknowledgment is not received, at 1512 a determination is made whether the file is complete. The determination can be made based upon a time out feature whereby if after a predetermined amount of time after the control message is sent at 1508 an acknowledgement is not received from the client it is assumed that the file delivery failed. In some embodiments, the client may send a failure message if the requested information is not received after a predetermined amount of time. It should be understood that other techniques can be utilized for determining where a particular information request is complete or not complete. If the determination is no, the method 1500 continues at 1508 and a subsequent control message is sent to the same or another application server and the process. This process can be repeated until the entire file is transferred. When it is determined at 1512 that the file is complete, normal operations resume (e.g., closing operations).

The only modification needed on the network application server software is that the kernel module should be informed when the file transfer is to be started along with the file identifier. All other operations are done transparently requiring no other change in the network application server software.

A feature of the method is the low overhead in case of transmission errors. The primary server does not need any knowledge about which application server failed to deliver the packet as it is taken care of by the reliability controls built into the TCP/IP protocol. Similar reliability measures can be used to support other transfer protocols. If the client does not receive a packet, it will not send an acknowledgment packet to the primary server. This will cause the primary server to resend the packet to another application server. Thus, the reliability of the transfer is achieved without the overhead of tracking which packet was sent through which application server.

Figure 16:
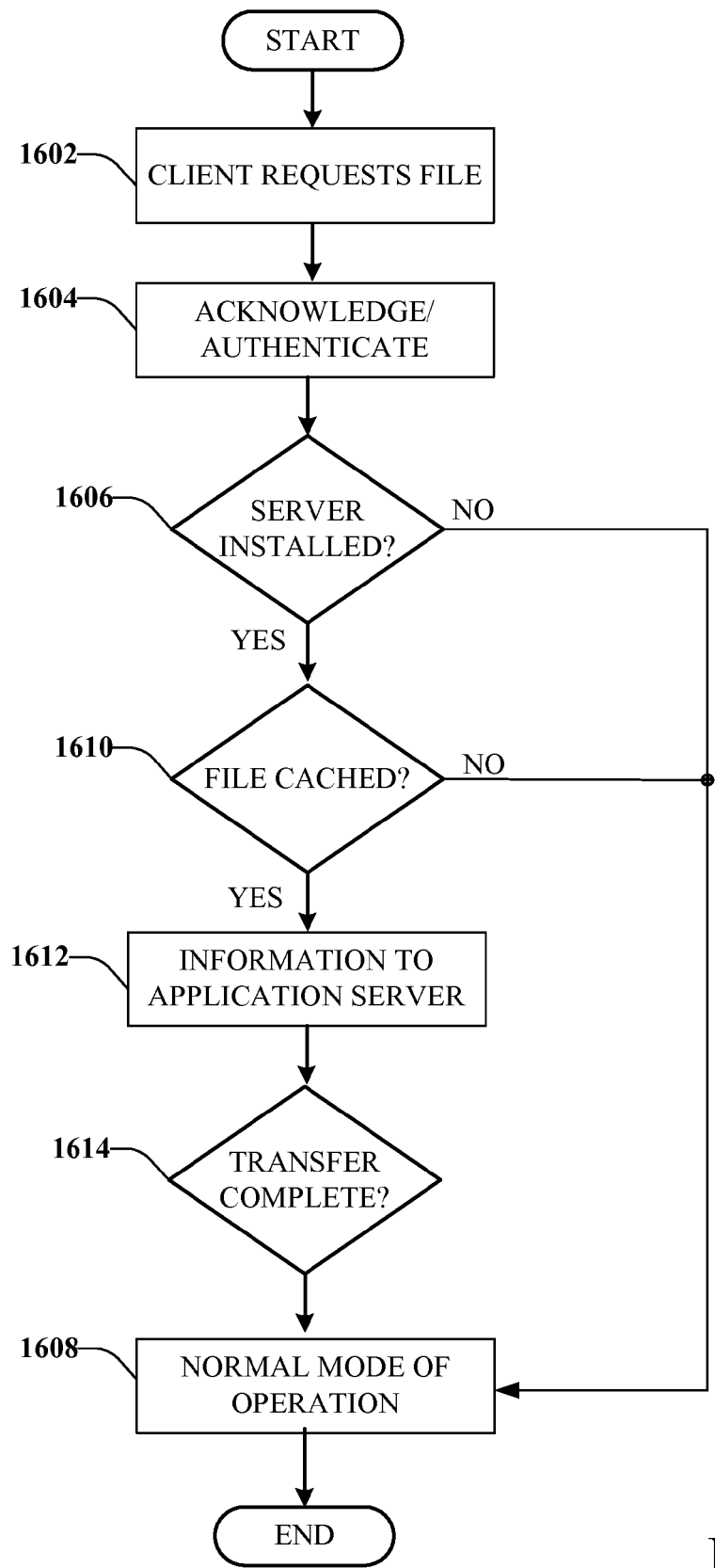
FIG. 16 illustrates a methodology for an information request when an application server is installed on the client machine according to the disclosed embodiments.

Referring now to FIG. 16, illustrated is a methodology 1600 for an information request when an application server is installed on the client according to the disclosed embodiments. The application server software is installed as a service similar to a firewall service. The difference between the application server installed on the client and the application server on the network is that the application server itself receives the client acknowledgment packets, thereby reducing network traffic and latency by serving the data locally. Typical data flow when the application server is installed on the client is as follows.

A request for information is received at 1602. This request can be received by communicating with a network application server software on a primary server for authentication and the sending of an actual file request, or it can be received directly from a client. At 1604, the request is acknowledged and, according to some embodiments, the client is authenticated. A primary server can complete the handshake, retrieve the data from the database, if necessary, and prepare the file for file transfer. At 1606, a determination is made whether the client has an application server installed. If the determination is that the client does not have an application server installed ("no"), the method continues at 1608 with a normal mode of operation.

If the determination is made that the client has an application server installed ("yes"), the method continues at 1610 and a determination is made whether the file is cached on the application server. The file cache in the application server can be populated by various means such as pushing of files by the primary server to the application server or from other connected application servers. In some embodiments, a local database may have a list of files cached by an application server, which can be accessed to make the determination at 1610. If the determination at 1610 is no, the method continues at 1608 with normal mode of operation. If at 1610 it is determined that the application server has the file cached, the method continues at 1612 and the request for information is sent to the application server to commence file transfer. Control of the information request is transferred to the application server.

At 1614, a determination is made whether the information transfer request is complete. For example, an acknowledgment can be received from the client indicating that the information transfer is complete, or other techniques can be utilized. If it is determined that the information transfer is not complete, a message, signal, or other indicator means is sent to the application server to resend the information. If it is determined that the transfer is compete ("yes") normal operation is resumed at 1608 and control is relinquished from the application server.

Figure 17:
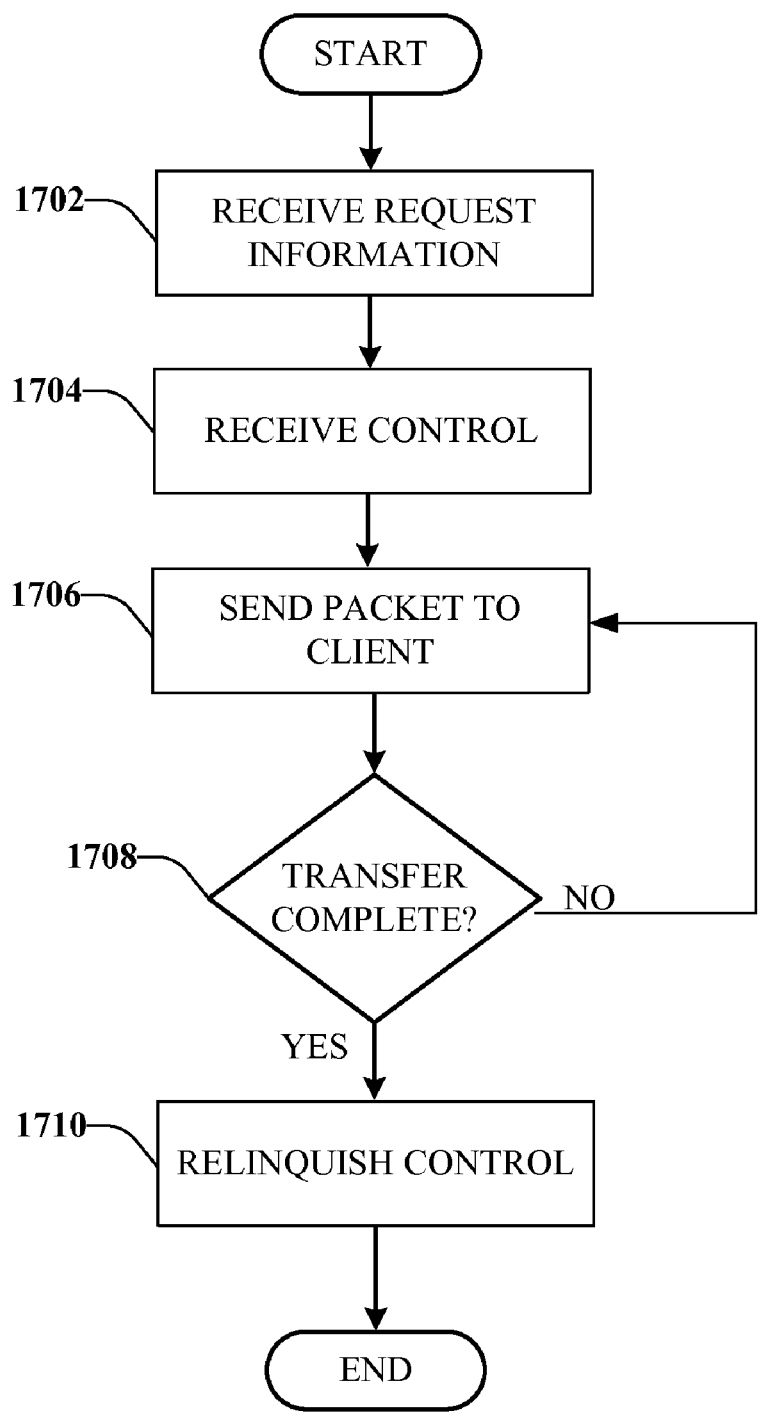
FIG. 17 illustrates a methodology for retrieving and delivering requested information to a client.

FIG. 17 illustrates a methodology 1700 for retrieving and delivering requested information to a client. At 1702, an information request is received. This information request can be from a management component that received the request from a user. The management component, upon receiving the request, makes a determination which application components are best suited to deliver the request. At substantially the same time as the information request is received, control of the information request is received at 1704. This control can be relinquished from the management component. For example, the live connection between the client and the management component can be transferred, based on the information provided by the management component. The information can include the sequence numbers, TCP/IP flags etc. Packets destined for the primary server can now be intercepted and the packets with the requested information (injected packets) can be sent to the client, at 1706. The injected packets received by the client application appear to be from the primary server. Therefore, no modification is necessary on the client application for the present method of data delivery to work.

At 1708, a determination is made if the file transfer is complete. This determination can be based upon a reply received from the client acknowledging receipt of the packet. It can also be based on acknowledgement received from a management component, or through other acknowledgment means. If it is determined that the transfer is not complete ("no"), the method returns to 1706 and a packet is sent to the client, which can be another packet and/or substantially the same packet as previously sent. If the file transfer is completed successfully ("yes"), the application server relinquishes the control of the connection back to the management component, at 1710. The packets can now flow in their normal fashion to the management component. The management component performs any post processing that needs to be done to close the connection or to start another file transfer.

Figure 18:
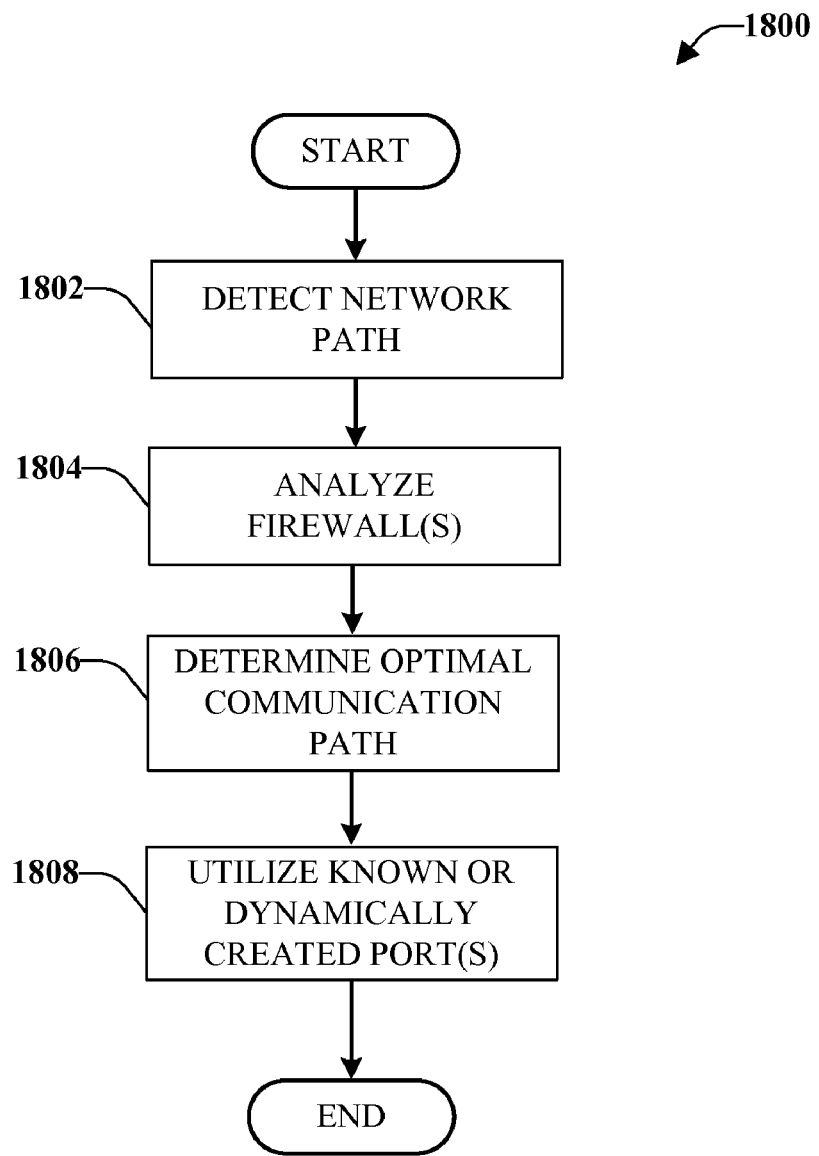
FIG. 18 illustrates a methodology for communication through various firewall devices.

FIG. 18 illustrates a methodology 1800 for communication through various security devices. At 1802, a network path is detected. This network path can be determined based on a request received from a user and/or entity (e.g., client, application server, . . . ). The network path is analyzed for any security devices (e.g., firewall) at 1804 and the type of firewall (e.g., hardware, software, packet filter, circuit gateway, application gateway, trusted gateway, and the like). In some embodiments, the network path may not have any firewall devices. In other embodiments or for other clients and/or entities, there can be one or more firewall present in the network path. The firewall(s) are analyzed to determine a firewall type.

At 1806, a determination is made as to the optimal communication path to utilize for the communication. The optimal communication path can be determined based in part on the existence of a firewall, of the type of firewall, the number of firewalls present, and other criteria relating to the firewall.

Based on the determination at 1806, the resulting communication can, at 1808, use TCP or UDP utilizing known or dynamically created ports depending on the firewall information analyzed.

Figure 19:
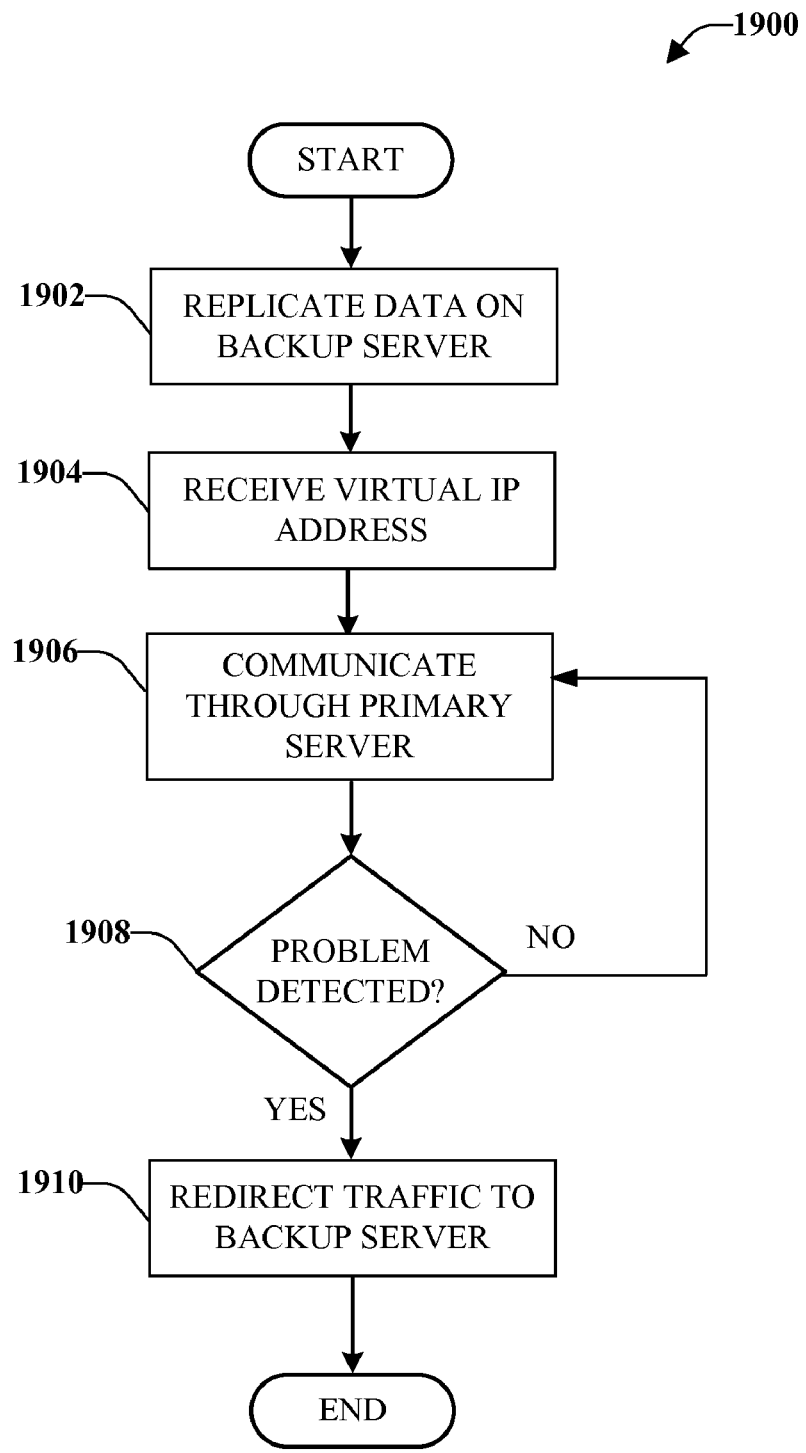
FIG. 19 illustrates a methodology for seamless disaster recovery.

FIG. 19 illustrates a methodology 1900 for seamless disaster recovery. At 1902, data associated with a primary server is replicated or mirrored on a backup server. The data can be periodically or continuously communicated between the backup server and the primary server to maintain the integrity and similarity of data on both servers.

At 1904, a virtual IP address is received from, for example, a user and/or entity. The virtual IP address identifies the primary server with which the client desires to communicate. A network switch can intelligently manage the single virtual IP address. Information or data is communication by the primary server to the user and/or entity at 1906. At 1908, a determination is made whether there is a problem with the primary server. For example, the primary server can experience a fault or become unavailable due to unforeseen and/or foreseen events.

If a problem is not detected ("no"), the method continues at 1906 and the communication is provided by the primary server. If there is a problem detected ("yes"), the communication is redirected to the backup server, at 1910, and the virtual IP address is transferred to the backup server. If sufficient replication was performed at 1902, the network traffic can be easily redirected to the backup site and the user and/or entity can use the backup site with minimal (if any) disruption of service. The backup server can perform the necessary notification to claim ownership of the virtual IP address. Thus, the virtual IP address can be associated with the backup server and disassociated from the primary server.

Figure 20:
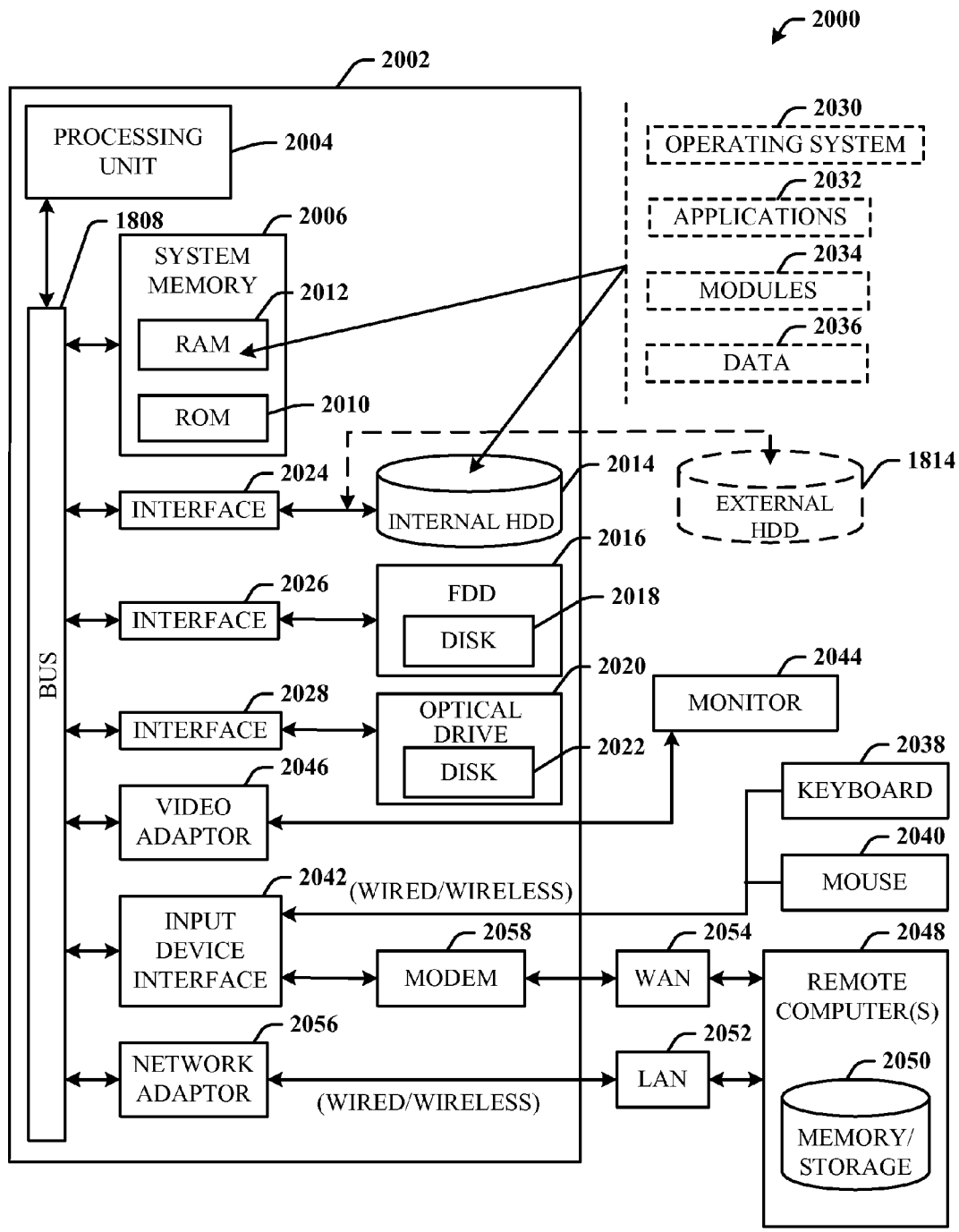
FIG. 20 illustrates a block diagram of a computer operable to execute the disclosed embodiments.

Referring now to FIG. 20, there is illustrated a block diagram of a computer operable to execute the disclosed architecture. In order to provide additional context for various aspects disclosed herein, FIG. 20 and the following discussion are intended to provide a brief, general description of a suitable computing environment 2000 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 20, the exemplary environment 2000 for implementing various aspects includes a computer 2002, the computer 2002 including a processing unit 2004, a system memory 2006 and a system bus 2008. The system bus 2008 couples system components including, but not limited to, the system memory 2006 to the processing unit 2004. The processing unit 2004 can be any of various commercially available processors. Dual microprocessors and other multi-processor architectures may also be employed as the processing unit 2004.

The system bus 2008 can be any of several types of bus structure that may further interconnect to a memory bus (with or without a memory controller), a peripheral bus, and a local bus using any of a variety of commercially available bus architectures. The system memory 2006 includes read-only memory (ROM) 2010 and random access memory (RAM) 2012. A basic input/output system (BIOS) is stored in a nonvolatile memory 2010 such as ROM, EPROM, EEPROM, which BIOS contains the basic routines that help to transfer information between elements within the computer 2002, such as during start-up. The RAM 2012 can also include a high-speed RAM such as static RAM for caching data.

The computer 2002 further includes an internal hard disk drive (HDD) 2014 (e.g., EIDE, SATA), which internal hard disk drive 2014 may also be configured for external use in a suitable chassis (not shown), a magnetic floppy disk drive (FDD) 2016, (e.g., to read from or write to a removable diskette 2018) and an optical disk drive 2020, (e.g., reading a CD-ROM disk 2022 or, to read from or write to other high capacity optical media such as the DVD). The hard disk drive 2014, magnetic disk drive 2016 and optical disk drive 2020 can be connected to the system bus 2008 by a hard disk drive interface 2024, a magnetic disk drive interface 2026 and an optical drive interface 2028, respectively. The interface 2024 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 2002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 2012, including an operating system 2030, one or more application programs 2032, other program modules 2034 and program data 2036. All or portions of the operating system, applications, modules, and/or data can also be cached in the RAM 2012. It is appreciated that the various embodiments can be implemented with various commercially available operating systems or combinations of operating systems.

A user can enter commands and information into the computer 2002 through one or more wired/wireless input devices, e.g., a keyboard 2038 and a pointing device, such as a mouse 2040. Other input devices (not shown) may include a microphone, an IR remote control, a joystick, a game pad, a stylus pen, touch screen, or the like. These and other input devices are often connected to the processing unit 2004 through an input device interface 2042 that is coupled to the system bus 2008, but can be connected by other interfaces, such as a parallel port, an IEEE 1394 serial port, a game port, a USB port, an IR interface, etc.

A monitor 2044 or other type of display device is also connected to the system bus 2008 via an interface, such as a video adapter 2046. In addition to the monitor 2044, a computer typically includes other peripheral output devices (not shown), such as speakers, printers, etc.

The computer 2002 may operate in a networked environment using logical connections via wired and/or wireless communications to one or more remote computers, such as a remote computer(s) 2048. The remote computer(s) 2048 can be a workstation, a server computer, a router, a personal computer, portable computer, microprocessor-based entertainment appliance, a peer device or other common network node, and typically includes many or all of the elements described relative to the computer 2002, although, for purposes of brevity, only a memory/storage device 2050 is illustrated. The logical connections depicted include wired/wireless connectivity to a local area network (LAN) 2052 and/or larger networks, e.g., a wide area network (WAN) 2054. Such LAN and WAN networking environments are commonplace in offices and companies, and facilitate enterprise-wide computer networks, such as intranets, all of which may connect to a global communications network, e.g., the Internet.

When used in a LAN networking environment, the computer 2002 is connected to the local network 2052 through a wired and/or wireless communication network interface or adapter 2056. The adaptor 2056 may facilitate wired or wireless communication to the LAN 2052, which may also include a wireless access point disposed thereon for communicating with the wireless adaptor 2056.

When used in a WAN networking environment, the computer 2002 can include a modem 2058, or is connected to a communications server on the WAN 2054, or has other means for establishing communications over the WAN 2054, such as by way of the Internet. The modem 2058, which can be internal or external and a wired or wireless device, is connected to the system bus 2008 via the serial port interface 2042. In a networked environment, program modules depicted relative to the computer 2002, or portions thereof, can be stored in the remote memory/storage device 2050. It will be appreciated that the network connections shown are exemplary and other means of establishing a communications link between the computers can be used.

The computer 2002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 21:
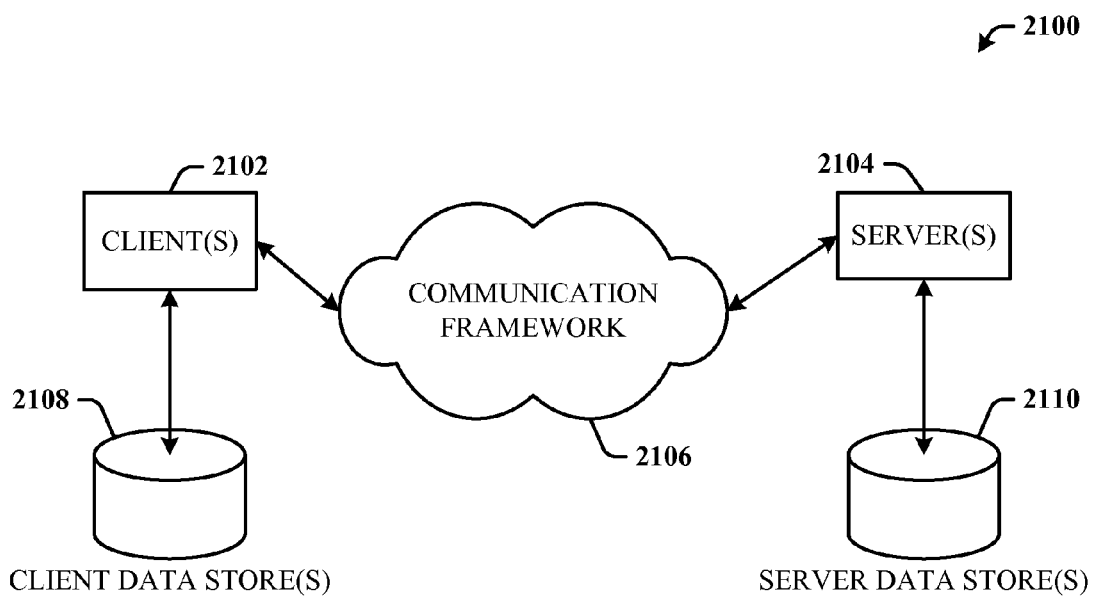
FIG. 21 illustrates a schematic block diagram of an exemplary computing environment operable to execute the disclosed embodiments.

Referring now to FIG. 21, there is illustrated a schematic block diagram of an exemplary computing environment 2100 in accordance with the various embodiments. The system 2100 includes one or more client(s) 2102. The client(s) 2102 can be hardware and/or software (e.g., threads, processes, computing devices). The client(s) 2102 can house cookie(s) and/or associated contextual information by employing the various embodiments, for example.

The system 2100 also includes one or more server(s) 2104. The server(s) 2104 can also be hardware and/or software (e.g., threads, processes, computing devices). The servers 2104 can house threads to perform transformations by employing the various embodiments, for example. One possible communication between a client 2102 and a server 2104 can be in the form of a data packet adapted to be transmitted between two or more computer processes. The data packet may include a cookie and/or associated contextual information, for example. The system 2100 includes a communication framework 2106 (e.g., a global communication network such as the Internet) that can be employed to facilitate communications between the client(s) 2102 and the server(s) 2104.

Communications can be facilitated via a wired (including optical fiber) and/or wireless technology. The client(s) 2102 are operatively connected to one or more client data store(s) 2108 that can be employed to store information local to the client(s) 2102 (e.g., cookie(s) and/or associated contextual information). Similarly, the server(s) 2104 are operatively connected to one or more server data store(s) 2110 that can be employed to store information local to the servers 2104.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for scalable data delivery, comprising:
   receiving, at a primary server, a request for data;
   identifying a plurality of application servers to process the request for data;
   sending a control message to the plurality of application servers, wherein the control message includes mapping information to allow the plurality of application servers to download directly from a storage device; and
   temporarily relinquishing control of the request for data, from the primary server, to the plurality of application servers at substantially the same time as sending the control message.

2. The method of claim 1, further comprising:
   receiving a packet received acknowledgement from a sender of the request for data; and
   resuming control of the request for data from the plurality of application servers.

3. The method of claim 1, wherein the identifying is performed autonomously based upon a determination of the plurality of application servers that can perform the request for data.

4. The method of claim 1, further comprising:
   determining if a file transfer is complete; and
   resuming control of the request for data from the plurality of application servers if the file transfer is complete.

5. The method of claim 1, further comprising:
   determining if a file transfer is complete; and
   sending a subsequent control message to the plurality of application servers if the file transfer is not complete.

6. The method of claim 1, further comprising:
   retrieving at least a portion of the request for data; and
   sending the at least the portion of the request for data utilizing a spoofing technique.

7. The method of claim 1, wherein the receiving the request for data is at one or more of the plurality of application servers that have the same Internet Protocol (IP) address.

8. The method of claim 1, further comprising:
   obtaining control of the request for data, wherein control of the request for data was temporarily relinquished; and
   resuming processing of the request for data.

9. The method of claim 1, further comprising:
   supporting failover, wherein if a first server fails, a second server takes over functionality of the first server.

10. The method of claim 1, further comprising:
    authenticating a sender of the request for data.

11. The method of claim 1, further comprising:
    receiving an availability acknowledgement from at least one of the plurality of application servers in response to the control message.

12. A scalable distributed storage system, comprising:
    means for receiving a request;
    means for identifying at least one application server to process the request;
    means for directing the request through at least one symbolic link to a plurality of storage servers;
    means for dynamically adding at least one storage server without modification of the at least one symbolic link;
    means for processing a portion of the request; and
    means for sending the portion in reply to the request.

13. The system of claim 12, further comprising:
    means for relinquishing control of the request; and
    means for sending a control message to the at least one application server.

14. The system of claim 12, further comprising:
    means for utilizing a spoofing technique to disguise a sender of the request.

15. The system of claim 12, further comprising:
    means for determining if a response to the request is received by a sender of the request; and
    means for resending the request if the response was not received.

16. An apparatus, comprising:
    an interface module configured to receive a request for data; and
    an optimizer module configured to identify a plurality of stateless application components that can process the request, wherein the apparatus temporarily releases control of processing the request to at least one of the plurality of application components.

17. The apparatus of claim 16, further comprising a confirm module that receives an acknowledgment when the data is provided by the at least one of the plurality of application components.

18. The apparatus of claim 17, wherein the apparatus resumes control of processing the request when the acknowledgment is received.

19. The apparatus of claim 16, wherein the apparatus comprises a single virtual internet protocol address.

20. The apparatus of claim 16, further comprising a mapping module configured to provide information to the at least one of the plurality of applications components, wherein the at least one of the plurality of application components directly accesses a storage component for retrieval of the data.

* * * * *